(12) United States Patent
Yamada

(10) Patent No.: US 10,359,861 B2
(45) Date of Patent: Jul. 23, 2019

(54) ELECTRONIC DEVICE AND CONTROL METHOD THEREOF

(71) Applicant: CANON KABUSHIKI KAISHA, Tokyo (JP)

(72) Inventor: Motonari Yamada, Tokyo (JP)

(73) Assignee: Canon Kabushiki Kaisha, Tokyo (JP)

(*) Notice: Subject to any disclaimer, the term of this patent is extended or adjusted under 35 U.S.C. 154(b) by 129 days.

(21) Appl. No.: 15/603,289

(22) Filed: May 23, 2017

(65) Prior Publication Data

US 2017/0351347 A1 Dec. 7, 2017

(30) Foreign Application Priority Data

Jun. 1, 2016 (JP) ................................ 2016-110463

(51) Int. Cl.
| | | |
|---|---|---|
| *G06F 3/0346* | (2013.01) | |
| *G06F 3/041* | (2006.01) | |
| *G06F 1/16* | (2006.01) | |
| *H04M 1/02* | (2006.01) | |
| *H04W 88/02* | (2009.01) | |

(52) U.S. Cl.
CPC .......... *G06F 3/0346* (2013.01); *G06F 1/1626* (2013.01); *G06F 1/1656* (2013.01); *G06F 1/1658* (2013.01); *G06F 1/1669* (2013.01); *G06F 1/1686* (2013.01); *G06F 1/1694* (2013.01); *G06F 3/041* (2013.01); *H04M 1/026* (2013.01); *H04M 1/0254* (2013.01); *H04M 1/0264* (2013.01); *G06F 2200/1635* (2013.01); *H04W 88/02* (2013.01)

(58) Field of Classification Search
CPC ...... G06F 3/0346; G06F 3/041; G06F 1/1626; G06F 1/1656; G06F 1/1658; G06F 1/1669
See application file for complete search history.

(56) References Cited

U.S. PATENT DOCUMENTS

| | | | | |
|---|---|---|---|---|
| 9,785,487 | B1* | 10/2017 | Liu | ................... G06F 1/1632 |
| 2012/0293330 | A1* | 11/2012 | Grant | ................ G08B 13/1427 |
| | | | | 340/568.8 |
| 2013/0232280 | A1* | 9/2013 | Perek | .................... G06F 1/1618 |
| | | | | 710/14 |
| 2014/0288822 | A1* | 9/2014 | Morrison | ................ G01S 19/23 |
| | | | | 701/466 |
| 2015/0245723 | A1* | 9/2015 | Alexander | ........... A47G 19/027 |
| | | | | 99/483 |
| 2016/0335140 | A1* | 11/2016 | Liu | ....................... G06F 1/1633 |

FOREIGN PATENT DOCUMENTS

| | | |
|---|---|---|
| JP | 2002-176478 A | 6/2002 |
| JP | 2014-508998 A | 4/2014 |

\* cited by examiner

*Primary Examiner* — Ricardo Osorio
(74) *Attorney, Agent, or Firm* — Canon U.S.A., Inc. IP Division

(57) ABSTRACT

A plurality of modules are connected to the front side and back side of an electronic device via corresponding attachment/detachment units. The electronic device includes an orientation detection unit that detects the orientation of the electronic device. Based on a selection of a module to be removed and a touch operation on a touch panel of the electronic device, the selected module is determined to be either on the front side or the back side of the electronic device. When the electronic device is in an orientation suitable for removal of the selected module, the module is disconnected from the electronic device by a corresponding attachment/detachment unit.

16 Claims, 38 Drawing Sheets

FIG. 2A
FIG. 2B
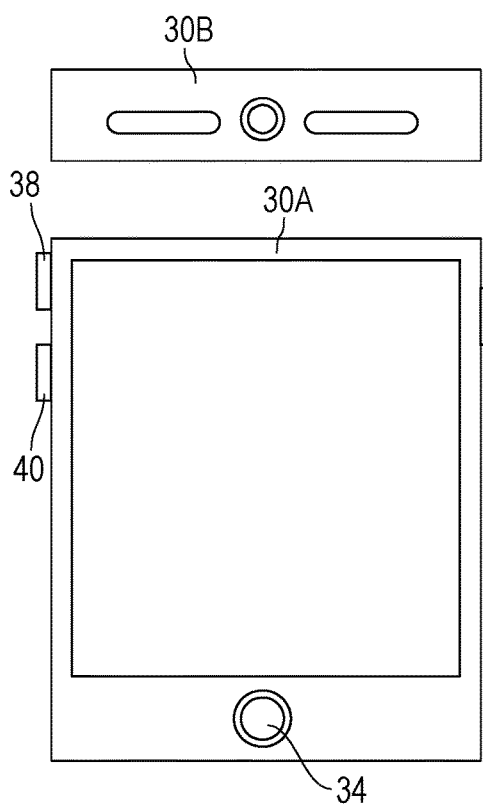
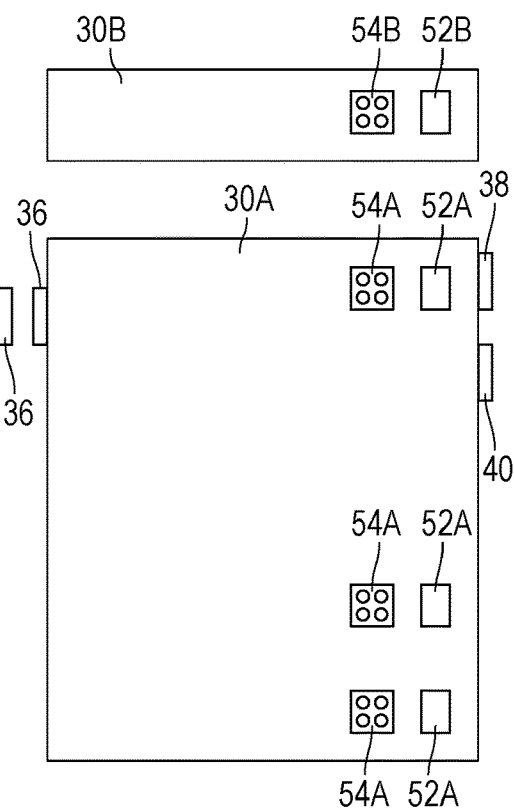
FIG. 2C
FIG. 2D
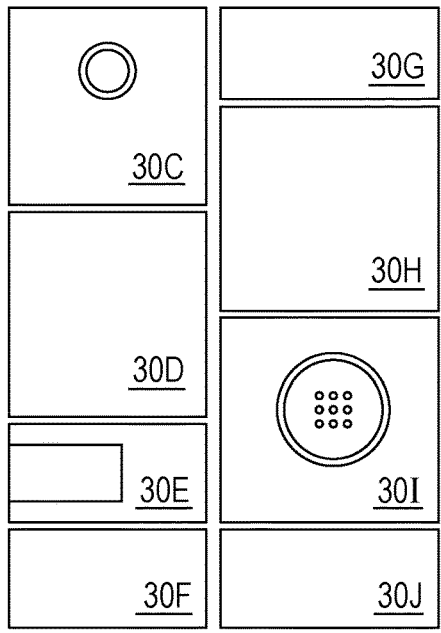
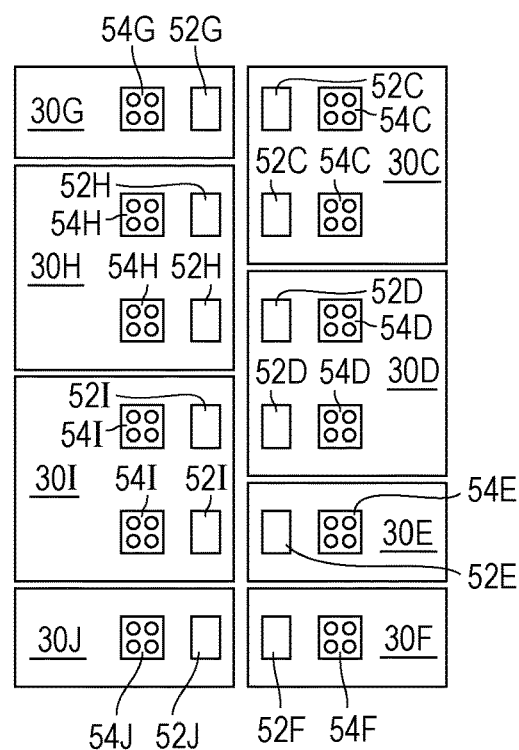

EXCITATION CURRENT

EXCITATION CURRENT

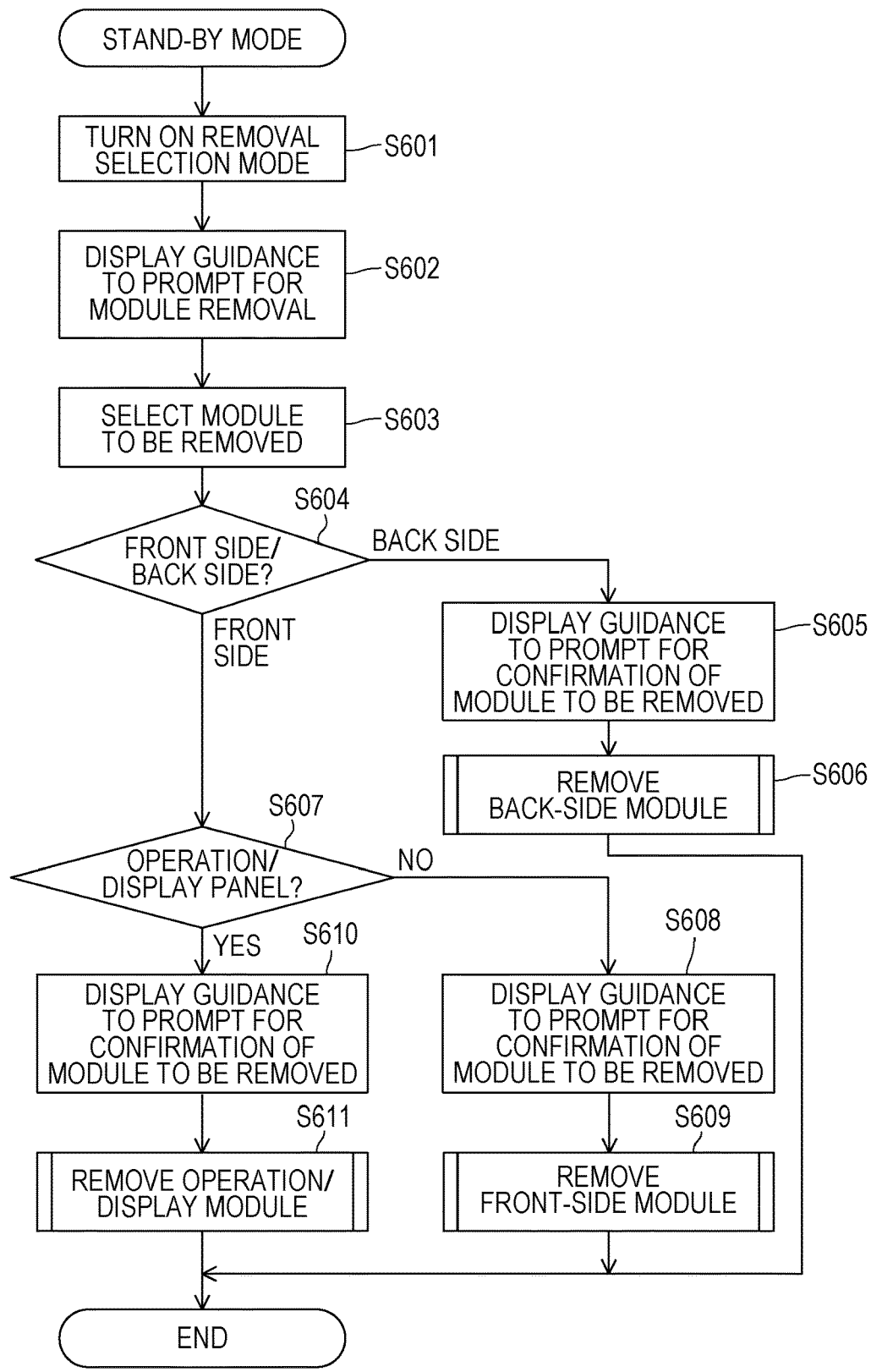

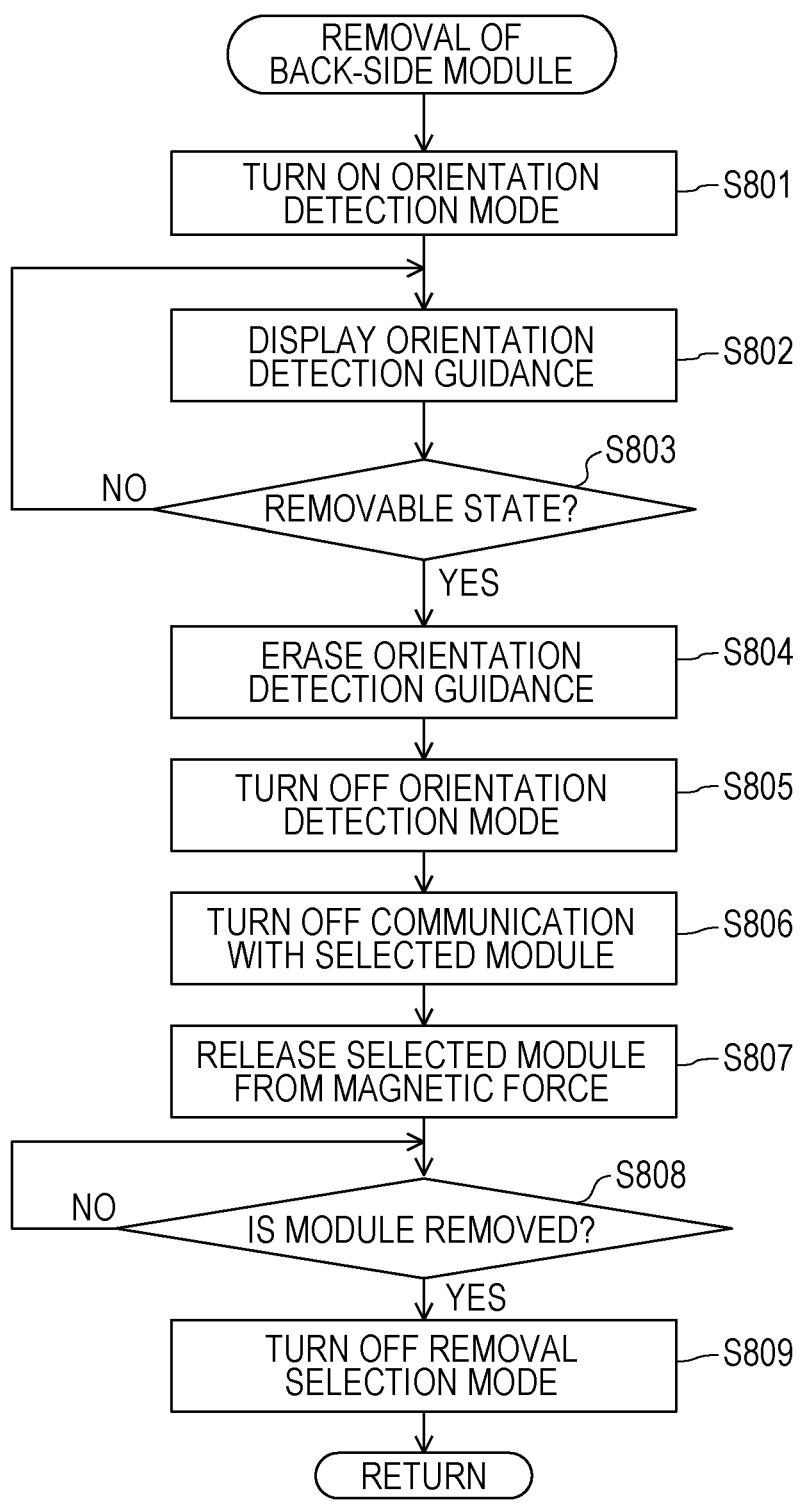

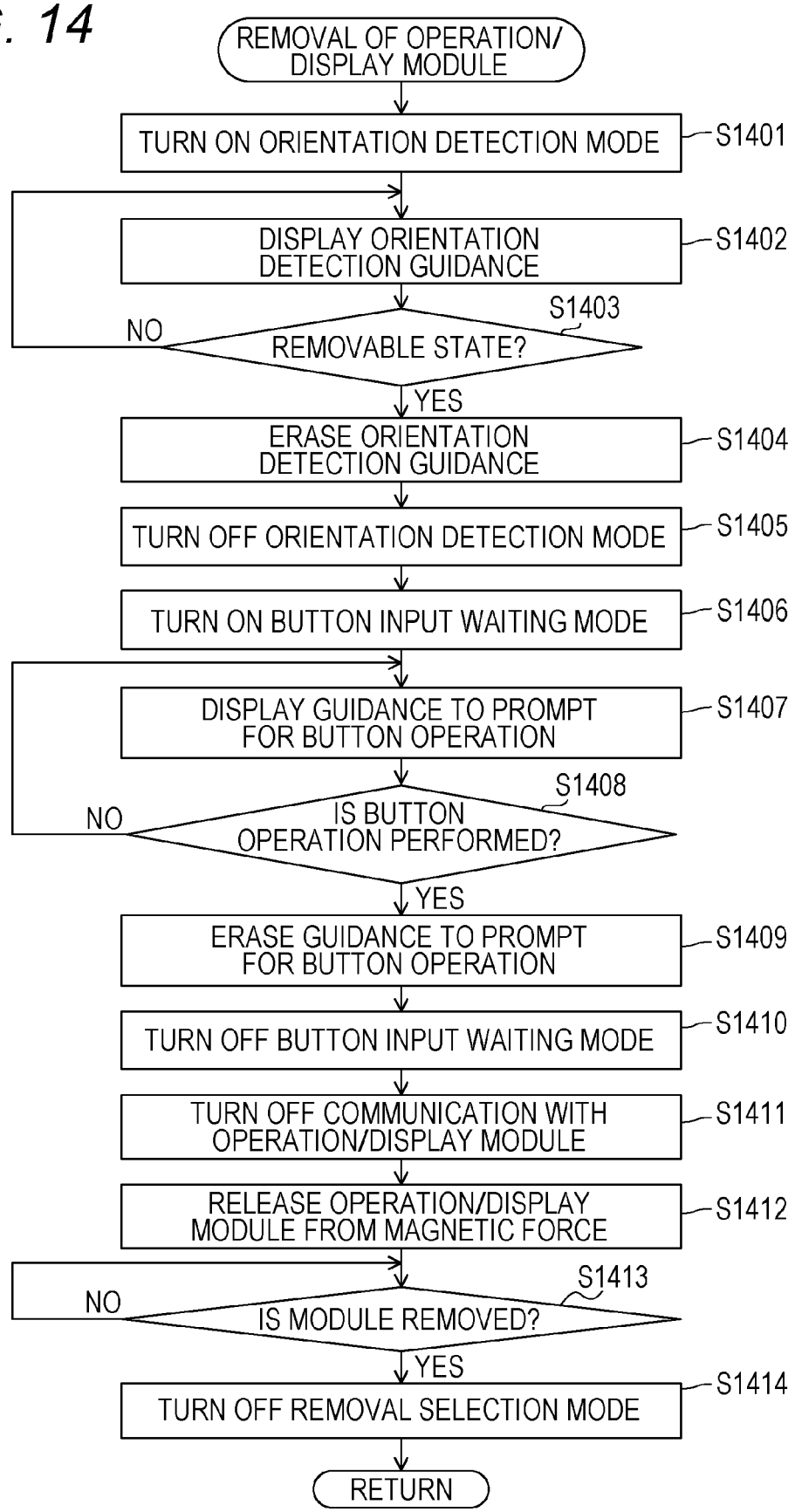

2400

| 2402 | 2404 | 2406 |
|---|---|---|
| FRONT-SIDE MODULE | BACK-SIDE LEFT MODULE | BACK-SIDE RIGHT MODULE |
|  |  |  |
|  |  |  |
|  |  |  |
|  |  |  |

| 2402 | 2404 | 2406 |
|---|---|---|
| FRONT-SIDE MODULE | BACK-SIDE LEFT MODULE | BACK-SIDE RIGHT MODULE |
| MICROPHONE/ CAMERA | RECORDING | POWER SUPPLY |
|  | I/O | COMMUNICATION |
|  | NFC |  |
|  |  |  |

FIG. 34A

| 2402 | 2404 | 2400 2406 |
|---|---|---|
| FRONT-SIDE MODULE | BACK-SIDE LEFT MODULE | BACK-SIDE RIGHT MODULE |
| MICROPHONE/ CAMERA | RECORDING | POWER SUPPLY |
|  | I/O | COMMUNICATION |
|  | NFC |  |
|  |  |  |

FIG. 34B

| 2402 | 2404 | 2400 2406 |
|---|---|---|
| FRONT-SIDE MODULE | BACK-SIDE LEFT MODULE | BACK-SIDE RIGHT MODULE |
| MICROPHONE/ CAMERA |  | POWER SUPPLY |
|  |  | COMMUNICATION |
|  |  |  |
|  |  |  |

FIG. 34C

| 2402 | 2404 | 2400 2406 |
|---|---|---|
| FRONT-SIDE MODULE | BACK-SIDE LEFT MODULE | BACK-SIDE RIGHT MODULE |
| MICROPHONE/ CAMERA |  |  |
|  |  |  |
|  |  |  |
|  |  |  |

FIG. 34D

| 2402 | 2404 | 2400 2406 |
|---|---|---|
| FRONT-SIDE MODULE | BACK-SIDE LEFT MODULE | BACK-SIDE RIGHT MODULE |
|  |  |  |
|  |  |  |
|  |  |  |
|  |  |  |

ELECTRONIC DEVICE AND CONTROL METHOD THEREOF

BACKGROUND

Field

The present disclosure relates to an electronic device including modules detachably attached by magnetic force and a control method thereof.

Description of the Related Art

There have been proposed electronic devices that enable recombining of modules with unified functions like blocks to make the various functions selectable.

In smartphones, a touch panel is laid on a display screen to form one module unit to improve operability, thereby achieving an operation system in which the relationship between displays and operations can be intuitively grasped. When the interchangeable module configuration described above is applied to the smartphone, the display and the touch panel are arranged on the front side of the smartphone and other various modules are arranged interchangeably on the back side of the smartphone. In addition, the modules are removed, for example, by operating the touch panel.

Japanese Patent Laid-Open No. 2002-176478 describes that the receiver unit and the display unit of a cellular phone are fixed together by magnetic force.

PCT Japanese Translation Patent Publication No. 2014-508998 describes a configuration in which modules are fixed to a casing by an electromagnetic attachment/detachment mechanism (EPM) such that the modules are removed by demagnetizing or degaussing a permanent electromagnet in the EPM through the removal operation on the touch panel and the operation of a predetermined operation button.

In general, the display and the touch panel are formed as one module unit, that is, an operation/display module. The operation/display module is relatively heavy in weight and is disposed on the whole front side of the smartphone. Accordingly, at the moment when the permanent electromagnet is demagnetized to remove the operation/display module from the main body, for example, the operation/display module can slip down from the main body under its own weight.

In addition, to remove a module on the back side of the smartphone, there is a need for some countermeasure against dropping of the module, such as providing an instruction for demagnetization of the electromagnet by an operation icon on the touch panel with the back side facing up.

What is needed is an electronic device in which modules fixed by an electromagnetic attachment/detachment mechanism can be safely removed from a main body of the electronic device and a control method thereof.

SUMMARY

An electronic device includes an attachment/detachment unit configured to connect a module to the electronic device in a removable manner, an orientation detection unit configured to detect an orientation of the electronic device, and a control unit configured to perform control such that a module to be removed from the electronic device is disconnected by the attachment/detachment unit when the orientation detection unit detects the module to be removed is in an orientation suited for removal from the electronic device.

Further features will become apparent from the following description of exemplary embodiments (with reference to the attached drawings).

BRIEF DESCRIPTION OF THE DRAWINGS

The accompanying drawings, which are incorporated in and constitute a part of the specification, illustrate exemplary embodiments, features, and aspects and, together with the description, serve to explain the exemplary embodiments, features, and aspects.

FIGS. 2A to 2D are front views and bottom views of the modules.

FIG. 6 is a flowchart of an operation in a stand-by mode.

FIG. 8 is a flowchart of a back-side module removal routine.

FIG. 14 is a flowchart of an operation/display module removal routine.

FIGS. 34A to 34D are diagrams illustrating an example of transitions in the management table with module removal.

DESCRIPTION OF THE EMBODIMENTS

Various exemplary embodiments, features, and aspects will be described in detail below with reference to the drawings.

EXAMPLE 1

Figure 1A:
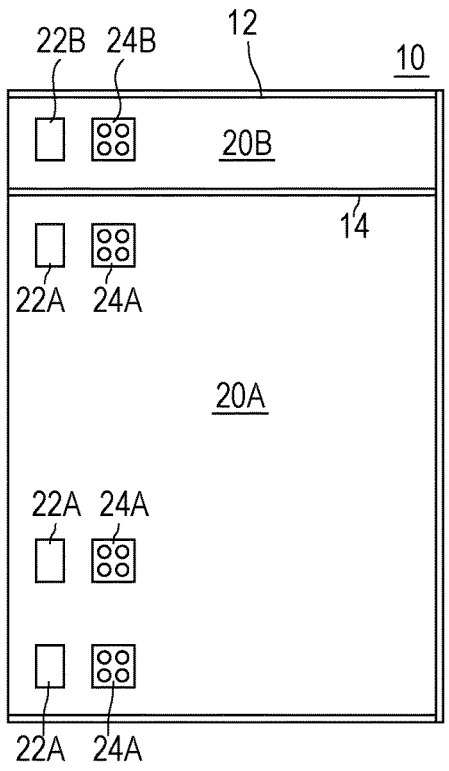
FIGS. 1A to 1D are planar views of a main body and module attachment states according to Example 1.
Figure 1B:
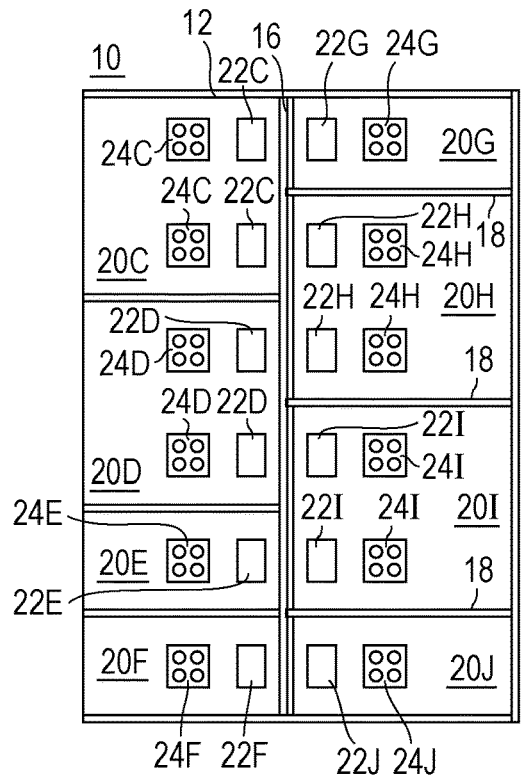
Figure 1C:
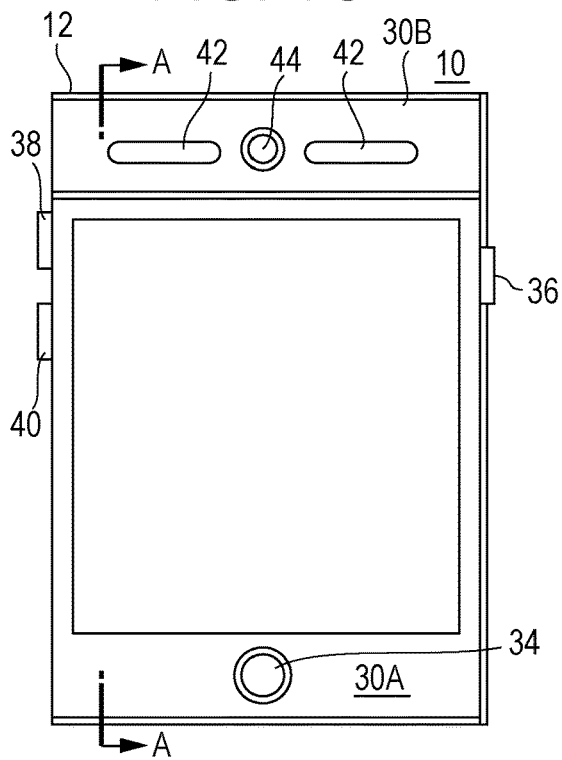
Figure 1D:
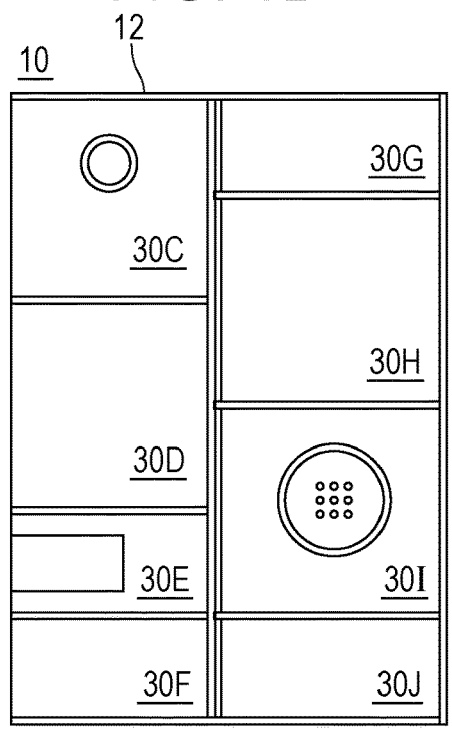

FIG. 1A to 1D are front views and rear views of planar examples of an electronic device according to an exemplary embodiment with and without modules. FIG. 1A is a front view of an electronic device 10 with modules, FIG. 1B is a rear view of the same, FIG. 1C is a front view of the electronic device 10 with modules, and FIG. 1D is a rear view of the same.

As illustrated in FIGS. 1A and 1B, the electronic device 10 includes the front side of a main body 12 and a rib 14 that performs both the functions of a guide and a holder for sliding and attaching the modules to the main body 12 from the lateral direction. The electronic device 10 includes on the back side a spine 16 that divides the main body 12 into right and left areas and a plurality of ribs 18 that guides and holds the modules. The spine 16 performs both the functions of a guide and a holder for sliding and attaching the modules to the main body 12 from the lateral direction, and also performs the function of enhancing the rigidity of the main body 12.

The front side of the main body 12 is divided by the rib 14 into two module attachment areas 20A and 20B. The back side of the main body 12 is divided by the spine 16 and the ribs 18 into a plurality of module attachment areas 20C, 20D, 20E, 20F, 20G, 20H, 20I, and 20J. Permanent electromagnets (EPM) 22A to 22J constituting an electromagnetic attachment/detachment mechanism are arranged in the module attachment areas 20A to 20J. Main body-side contactless communication units (main body-side CMCs) 24A to 24J are included in the vicinity of the EPMs 22A to 22J to perform data communications between the main body 12 and the modules. That is, at least one each pair of the EPMs 22A to 22J and the main body-side CMCs 24A to 24J is provided in the module attachment areas 20A to 20J. Depending on the sizes of the divided areas, a plurality of pairs of EPMs and main body-side CMCs can be provided in some areas.

As illustrated in FIG. 1A, on the front side of the main body 12, the EPMs 22A and 22B are provided near the left end portion, and the main body-side CMCs 24A and 24B are provided on the right side of the EPMs 22A and 22B. As illustrated in FIG. 1B, on the back side of the main body 12, the EPMs 22C to 22J are provided adjacent to the spine 16 in the divided areas 20C to 20J. In the areas 20C to 20F on the left side of the spine 16, the main body-side CMCs 24C to 24F are provided on the left side of the EPMs 22C to 22F. In the areas 20G to 20J on the right side of the spine 16, the main body-side CMCs 24G to 24J are provided on the right side of the EPMs 22G to 22J.

As illustrated in FIG. 1C, modules 30A and 30B with predetermined functions are attached on the front side of the electronic device 10. As illustrated in FIG. 1D, modules 30C to 30J with predetermined functions are attached on the back side of the electronic device 10.

The module 30A is an operation/display module in which a touch panel is laid on and integrated with a display unit formed from a flat-plate display. In the operation/display module 30A, the display unit occupies approximately the entire surface, and an operation button (home button) 34 for use in switching among the contents on the display is arranged on the lower side of a display screen of the display unit. A power button 36 for switching between powering on and off the main body 12 is arranged on the right side surface of the operation/display module 30A. A volume adjustment button 38 for adjusting the volume and a manner button 40 for switching between turning on and off a mute setting by sliding are arranged on the left side surface of the operation/display module 30A.

A microphone/camera module 30B is attached to the upper area 20B on the front side of the main body 12. The microphone/camera module 30B includes a microphone unit 42 that detects a user's voice and an imaging unit 44 that acquires the image of the user when the electronic device 10 is used as a mobile phone.

On the back side of the main body 12, the modules 30C to 30F are arranged in the areas 20C to 20F on the left side of the spine 16. The module 30C is a camera module with various shooting capabilities. The module 30D is a recording module that saves various data. The module 30E is an external I/O module with a connector for external communications. The module 30F is an NFC module that performs near field radio communications.

The modules 30G to 30J are attached in the areas 20G to 20J on the right side of the spine 16. The module 30G is an application control module that controls the attachment and removal of the modules and the entire operation of the electronic device 10. The module 30H is a power supply module that supplies electric power to the main body 12. The module 30I is a speaker module that outputs music and operation sounds. The module 30J is a communication module that externally transmits and receives data in a wireless manner.

FIGS. 2A to 2D are external views of the modules 30A to 30J. FIG. 2A is a front view of the modules 30A and 30B attached on the front side, and FIG. 2B is a rear view of the modules 30A and 30B. FIG. 2C is a front view of the modules 30C to 30J attached on the back side, and FIG. 2D is a rear view of the modules 30C to 30J.

As illustrated in FIG. 2B, magnetic bodies 52A and 52B are arranged on the back side of the modules 30A and 30B at positions opposed to the EPMs 22A and 22B of the main body 12. The magnetic bodies 52A and 52B are preferably soft magnetic bodies small in coercive force and high in magnetic permeability. For example, the magnetic bodies 52A and 52B are formed from HIPERCO® 50, a soft magnetic alloy of iron, cobalt, and vanadium, or the like. Module-side contactless communication units (module-side CMCs) 54A and 54B are arranged on the back side of the modules 30A and 30B at positions opposed to the main body-side CMCs 24A and 24B of the main body 12 to perform data communications with the main body 12 through the main body-side CMCs 24A and 24B. The magnetic bodies 52A and 52B and the module-side CMCs 54A and 54B are arranged adjacent to each other. In the example illustrated in FIG. 2, the operation/display module 30A includes three pairs of magnetic bodies and module-side CMCs, and the microphone/camera module 30B includes one pair of magnetic body and module-side CMC.

As illustrated in FIG. 2D, magnetic bodies 52C to 52J and module-side CMCs 54C to 54J are provided in pairs on the back side of the modules 30C to 30G as with the modules 30A and 30B. Specifically, the magnetic bodies 52C to 52J are arranged on the back side of the modules 30C to 30J at positions opposed to the EPMs 22C to 22J. The magnetic bodies 52C to 52J are also preferably soft magnetic bodies. The module-side CMCs 54C to 54J are arranged on the back side of the modules 30C to 30J at positions opposed to the main body-side CMCs 24C to 24J. The module-side CMCs 54C to 54J can transmit and receive data to and from the main body 12 through the main body-side CMCs 24C to 24J with the modules 30C to 30J attached to the main body 12.

The magnetic bodies 52C to 52J and the module-side CMCs 54C to 54J are arranged adjacent to each other. The modules 30C, 30D, 30H, and 30I each include two pairs of magnetic bodies and module-side CMCs, and the modules 30E, 30F, 30G, and 30J each include one pair of magnetic body and module-side CMC.

Figure 3A:
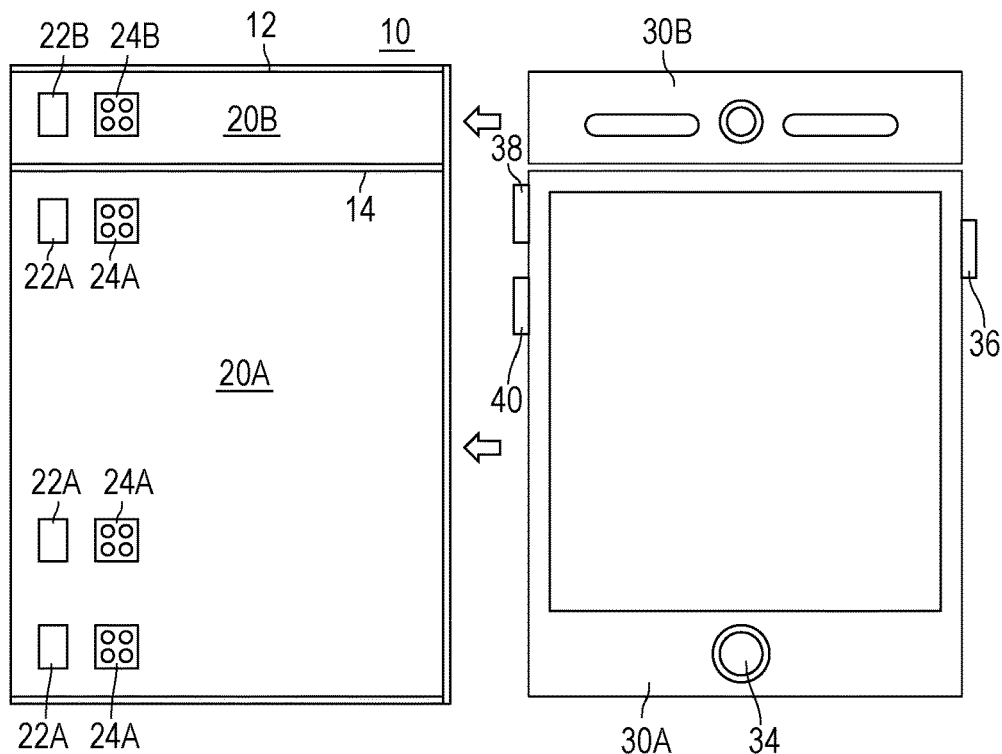
FIGS. 3A and 3B are planar views describing the directions in which the modules are attached to the main body.
Figure 3B:
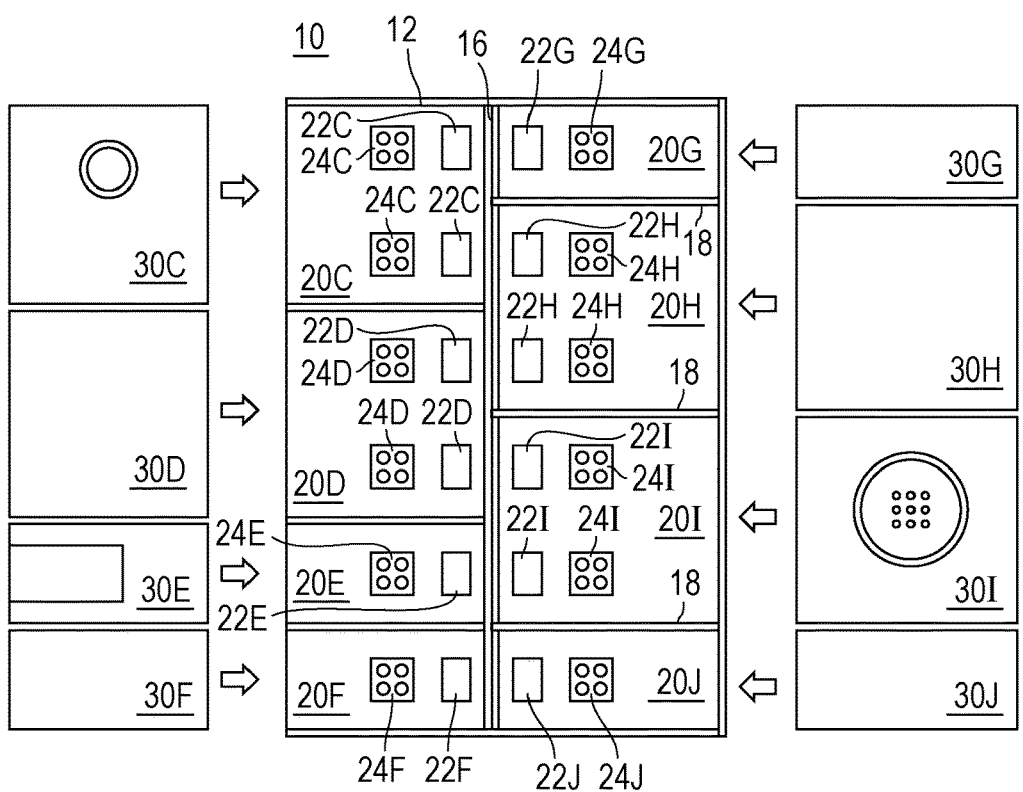

FIG. 3A is a diagram describing a method of attaching the modules 30A and 30B to the front side of the main body 12, and FIG. 3B is a diagram describing a method of attaching the modules 30C to 30J to the back side of the main body 12.

As illustrated in FIG. 3A, the operation/display module 30A and the microphone/camera module 30B are slid on the front side of the main body 12 along the rib 14 from the lateral direction and are attached to the main body 12. At this time, the operation/display module 30A and the microphone/camera module 30B are slidable and attachable to the main body 12 from either the left side or the right side of the main body 12.

As illustrated in FIG. 3B, the camera module 30C, the recording module 30D, the I/O module 30E, and the NFC module 30F are slid on the back side of the main body 12 from the left side and are attached to the main body 12. Placing the modules 30C to 30F on the spine 16 makes it possible to position the modules 30C to 30F in the main body 12. In addition, the application control module 30G, the power supply module 30H, the speaker module 30I, and the communication module 30J are slid on the back side of the main body 12 from the right side and are attached to the main body 12. Placing the modules 30G to 30J on the spine 16 makes it possible to position the modules 30G to 30J in the main body 12.

Figure 4A:
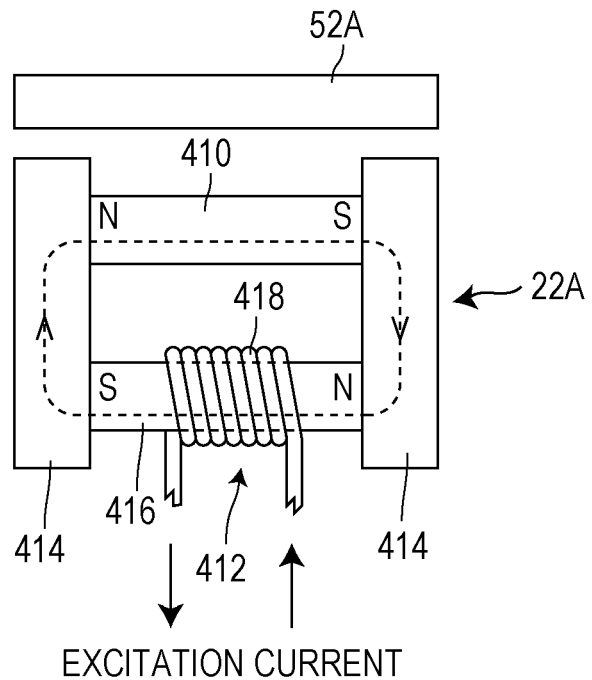
FIGS. 4A and 4B are diagrams describing the principle of a fixation mechanism with a permanent electromagnet.
Figure 4B:
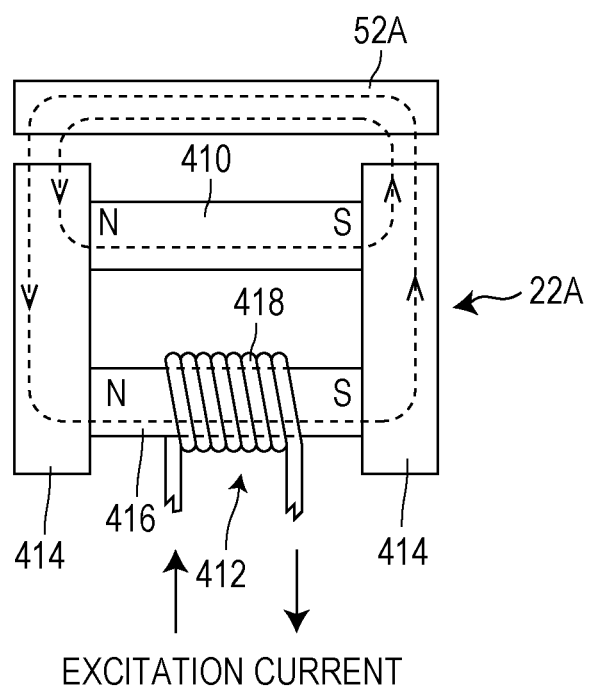

FIGS. 4A and 4B are schematic views of magnetic field lines in the EPM 22A of the main body 12 and the magnetic body 52A of the module 30A. FIG. 4A is a partial enlarged cross-sectional view of the main body 12 and the module 30A not coupled together by magnetic force taken along line A-A of FIG. 1C. FIG. 4B is a partial enlarged cross-sectional view of the main body 12 and the module 30A coupled together by magnetic force taken along line A-A of FIG. 1C.

As illustrated in FIG. 4A, the EPM 22A is structured in such a manner that a polarity-fixed permanent magnet 410 and a permanent electromagnet 412 are placed in parallel and both their ends are coupled and held by magnetic bodies 414. For example, the polarity-fixed permanent magnet 410 is a neodymium magnet with very strong magnetic force or the like.

The permanent electromagnet 412 is configured in such a manner that a coil 418 is wound around a reversible permanent magnet 416 made of a hard magnetic body such as alnico. When electric current flows to the coil 418, the reversible permanent magnet 416 is magnetized and remains in the magnetized state even after the end of the energization. The period of time of energizing the coil 418 is as very short time, e.g., one to several seconds. The permanent electromagnet 412 is a polarity-reversible permanent electromagnet in which the polarity is inverted when the exciting current that flows to the coil 418 changes direction.

The magnetic bodies 414 coupling the polarity-fixed permanent magnet 410 and the permanent electromagnet 412 are preferably soft magnetic bodies small in coercive force and large in magnet permeability. For example, the magnetic bodies 414 are formed from HIPERCO® 50, a soft magnetic alloy of iron, cobalt, and vanadium, or the like.

When energizing the coil 418, the reversible permanent magnet 416 becomes magnetized and the permanent electromagnet 412 generates a magnetic field line different in direction from the magnetic field line in the polarity-fixed permanent magnet 410. As a result, the magnetic field line in the permanent electromagnet 412 and the magnetic field line in the polarity-fixed permanent magnet 410 are equally close to each other, whereby the magnetic force of attracting the magnetic body 52A of the module 30A becomes very weak. At this time, the module 30A can easily separate from the main body 12 by a small force under no attracting force of the EPM 22C. The magnitude and direction of the electric current that flows to the coil 418 are set to the degree that the separation and removal can be achieved.

As illustrated in FIG. 4B, when the coil 418 is energized in the direction opposite to that illustrated in FIG. 4A, the reversible permanent magnet 416 becomes magnetized in the opposite direction and the permanent electromagnet 412 generates a magnetic field line in the same direction as that of the magnetic field line in the polarity-fixed permanent magnet 410. As a result, the magnetic field line in the permanent electromagnet 412 and the magnetic field line in the polarity-fixed permanent magnet 410 act in combination in the direction of attracting the magnetic body 52A of the module 30A, thereby generate a strong attracting force. Accordingly, the module 30A is firmly attached to the main body 12 under the attracting force of the EPM 22C.

Figure 5:
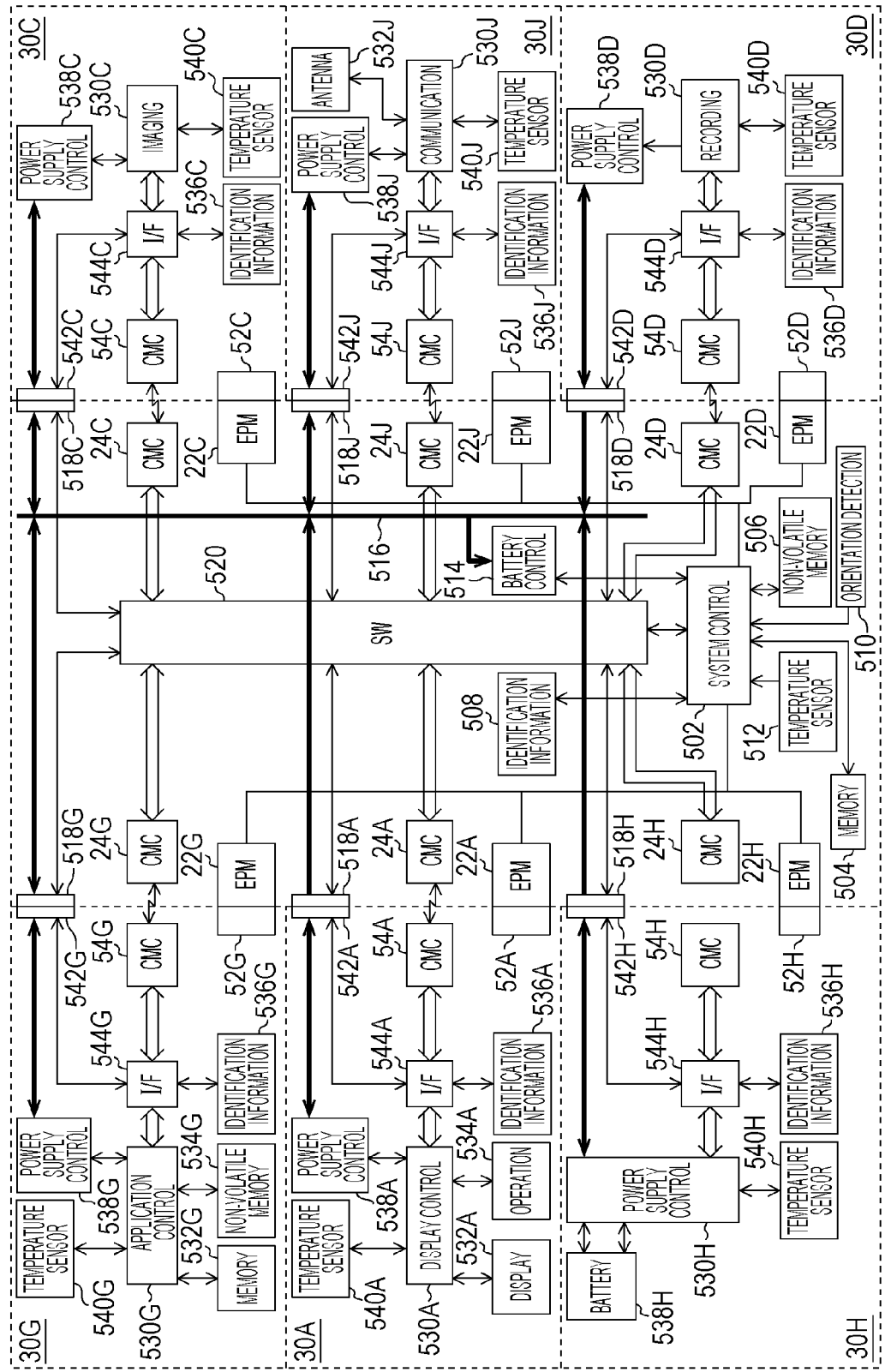
FIG. 5 is a schematic block diagram of the example illustrated in FIGS. 1A to 3B.

FIG. 5 is a schematic block diagram of a functional configuration of the electronic device 10. FIG. 5 does not illustrate the modules 30B, 30E, 30F, and 30I but these modules are the same in basic configuration as the illustrated modules except their respective dedicated capabilities.

System control unit 502 controls the electronic device 10, while a memory 504 stores constants, variables, programs, and others for operation of the system control unit 502. An electrically erasable and recordable non-volatile memory 506 stores constants, variables, programs, and others for operation of the system control unit 502, and, for example, is a flash memory or the like. An identification information memory 508 stores various kinds of identification information necessary for the main body 12 to communicate with the modules.

An orientation detection unit 510 detects the orientation of the main body 12 using an image and the like acquired from an acceleration sensor (not illustrated) or a camera (not illustrated). Temperature sensor(s) 512 measures the temperature of the main body 12 at predetermined positions.

A battery control circuit 514 supplies predetermined necessary voltages and currents to the respective components of the main body 12 and is connected to power supply bus 516. The battery control circuit 514 connects to power supply terminals of connectors 518A, 518C, 518D, 518G, 518H, and 518J via the power supply bus 516. The connectors 518A, 518C, 518D, 518G, 518H, and 518J have a terminal group related to power supply (power bus and ground), a terminal of a module attachment detection (DETECT) signal, a terminal of start (WAKE) signal for waking up the modules, and an RF signal terminal. The connectors of the modules opposed to the connectors 518A, 518C, 518D, 518G, 518H, and 518J are determined based on the relations between the frame structure of the main body 12 and the insertion connection positions of the modules. In the following description, the actions of these connectors will be explained by the positional relationships illustrated in FIG. 5.

Reference sign 520 represents a switch interface circuit that switches among high-speed communications of data and messages with the modules via the main body-side CMCs 24A, 24C, 24D, 24G, 24H, and 24J, and relays the same. The main body-side CMCs 24A, 24C, 24D, 24G, 24H, and 24J perform high-speed communications with the opposed module-side CMCs 54A, 54C, 54D, 54G, 54H, and 54J by an inductive coupling method. The module-side CMCs to communicate with the main body-side CMCs 24A, 24C, 24D, 24G, 24H, and 24J are determined based on the relations between the frame structure of the main body 12 and the insertion connection positions of the modules. Descriptions will be given with the combinations illustrated in FIG. 5.

The EPMs 22A, 22C, 22D, 22G, 22H, and 22J fix the opposed modules 30A, 30C, 30D, 30G, 30H, and 30J to the main body 12 by attracting the magnetic bodies 52A, 52C, 52D, 52G, 52H, and 52J under control of the magnetic force. The modules can be released from the main body 12 by controlling the EPMs 22A, 22C, 22D, 22G, 22H, and 22J to the non-attracting state. The magnetic bodies opposed to the EPMs 22A, 22C, 22D, 22G, 22H, and 22J are determined based on the relations between the frame structure of the main body 12 and the insertion connection positions of the modules. The operations will be explained by the positional relations illustrated in FIG. 5.

A configuration of the operation/display module 30A will now be explained. A display control unit 530A controls the operation/display module 30A, a display unit 532A includes an LCD, an OLED, an LED, or the like, and an operation unit 534A includes a touch panel and buttons 34, 36, 38, 40, and the like. The display control unit 530A displays various kinds of information, operation menus, and the like on the display unit 532A according to an instruction for control from an application control unit 530G of the application control module 30G. The user's touch operation on the operation unit 534A and the user's input operation through the buttons are transmitted to the application control unit 530G of the application control module 30G via the display control unit 530A.

an identification information memory 536A holds various kinds of identification information necessary for the operation/display module 30A to communicate with the main body 12 and the modules. A power supply control circuit 538A supplies predetermined necessary voltages and currents to the respective components of the operation/display module 30A. Temperature sensor(s) 540A measures the temperature of the operation/display module 30A at predetermined positions.

A connector 542A includes the same terminal structure as the connectors 518A, 518C, 518D, 518G, 518H, and 518J, and connects to the connector 518A of the main body 12 with the module in the attached state.

An interface 544A connects the module-side CMC 54A and the identification information memory 536A to the display control unit 530A and connects the display control unit 530A to the system control unit 502 of the main body 12 via the connector 542A.

A configuration of the imaging module 30C will now be explained. An imaging unit 530C controls the imaging module 30C and captures an image of a subject. Specifically, the imaging unit 530C includes a shooting optical system, an imaging sensor, an image processing circuit, an image recording circuit, and an image memory. The imaging unit 530C includes an automatic zoom capability, an automatic exposure (AE) capability for setting optimally aperture, shutter speed, and imaging sensor sensitivity, an automatic focusing (AF) capability, and an automatic white balance (AWB) capability.

The instruction for a shooting operation is provided to the imaging module 30C by the application program executed in the application control unit 530G or the user's operation on the operation unit 534A, such as the touch panel of the operation/display module 30A.

The images shot by the imaging module 30C can be displayed on the display unit 532A via the main body 12 and the display control unit 530A of the operation/display module 30A based on the instruction from the application control unit 530G of the application control module 30G. The instruction from the application control unit 530G can be provided by the application program executed in the application control unit 530G or the user's operation on the operation unit 534A of the display control module 30A.

An identification information memory 536C holds various kinds of identification information necessary for the imaging module 30C to communicate with the main body 12 and the modules. A power supply control circuit 538C supplies predetermined necessary voltages and currents to the respective components of the imaging module 30C. Temperature sensor(s) 540C measures the temperature of the imaging module 30C at predetermined positions.

A connector 542C includes the same terminal structure as the connectors 518A, 518C, 518D, 518G, 518H, and 518J, and connects to the connector 518C of the main body 12 with the module in the attached state.

An interface 544C connects the module-side CMC 54C and the identification information memory 536C to the imaging unit 530C and connects the display control unit 530A to the system control unit 502 of the main body 12 via the connector 542A.

A configuration of the recording module 30D will be explained. Reference sign 530D represents a recording unit that controls the recording module 30D. The recording unit 530D communicates with the attached modules via the main body 12 to record the received data on a recording medium and transmit the data reproduced from the recording medium to a specified module. An identification information memory 536D holds various kinds of identification information necessary for the recording module 30D to communicate with the main body 12 and the modules. A power supply control circuit 538D supplies predetermined necessary voltages and currents to the respective components of the recording module 30D. Temperature sensor(s) 540D measures the temperature of the recording module 30D at predetermined positions.

A connector 542D includes the same terminal structure as the connectors 518A, 518C, 518D, 518G, 518H, and 518J, and connects to the connector 518D of the main body 12 with the module in the attached state.

An interface 544D connects the module-side CMC 54D and the identification information memory 536D to the recording unit 530D and connects the recording unit 530D to the system control unit 502 of the main body 12 via the connector 542D.

A configuration of the application control module 30G will now be explained. An application control unit 530G controls the application control module 30G. The application control unit 530G executes various applications on a kernel or OS execution environment to operate the main body 12 and the attached modules in concert with each other. A memory 532G stores constants, variables, programs, and other information for operation of the application control unit 530G. An electrically erasable and recordable non-volatile memory 534G stores constants, variables, programs, and other information for operation of the application control unit 530G, and is, for example, a flash memory or the like.

An identification information memory 536G holds various kinds of identification information necessary for the application control module 30G to communicate with the main body 12 and the modules. A power supply control circuit 538G supplies predetermined necessary voltages and currents to the respective components of the application control module 30G. Temperature sensor(s) 540G measures the temperature of the application control module 30G at predetermined positions.

A connector 542G includes the same terminal structure as the connectors 518A, 518C, 518D, 518G, 518H, and 518J, and connects to the connector 518G of the main body 12 with the module in the attached state.

An interface 544G connects the module-side CMC 54G and the identification information memory 536G to the application control unit 530G and connects the application control unit 530G to the system control unit 502 of the main body 12 via the connector 542G.

A configuration of the power supply module 30H will now be explained. A battery control unit 530H performs control of the power supply module 30H including charging control and discharging control of a battery 538H. The battery control unit 530H supplies predetermined necessary voltages and currents to the respective components of the power supply module 30H.

An identification information memory 536H holds various kinds of identification information necessary for the power supply module 30H to communicate with the main body 12 and the modules. A battery 538H is, for example, a Li-ion cell or a fuel cell. The battery control unit 530H controls discharge of the battery 538H to the main body 12 and the modules (power feeding via the power supply bus 516) via a connector 480. Temperature sensor(s) 540H measures the temperature of the power supply module 30H at predetermined positions.

A connector 542H includes the same terminal structure as the connectors 518A, 518C, 518D, 518G, 518H, and 518J, and connects to the connector 518H of the main body 12 with the module in the attached state.

An interface 544H connects the module-side CMC 54H and the identification information memory 536H to the power supply control unit 530H, and connects the power supply control unit 530H to the system control unit 502 of the main body 12 via the connector 542G.

A configuration of the communication module 30J will now be explained. A communication unit 530J controls the communication module 30J. The communication unit 530J includes one or more of various long-distance communication capabilities such as TDMA, CDMA, and LTE, and includes one or more various near field communication capabilities such as Wi-Fi®, WiGig, and Bluetooth®. An antenna 532J connects to and communicates with other communication apparatuses in one or more various communication systems, such as Wi-Fi®, WiGig, Bluetooth®, and LTE.

An identification information memory 536J holds various kinds of identification information necessary for the communication module 30J to communicate with the main body 12 and the modules. A power supply control circuit 538J supplies predetermined necessary voltages and currents to the respective components of the communication module 30J. Temperature sensor(s) 540J measures the temperature of the communication module 30J at predetermined positions.

A connector 542J includes the same terminal structure as the connectors 518A, 518C, 518D, 518G, 518H, and 518J, and connects to the connector 518J of the main body 12 with the module in the attached state.

An interface 544J connects the module-side CMC 54J and the identification information memory 536J to the communication unit 530J, and connects the communication unit 530J to the system control unit 502 of the main body 12 via the connector 542J.

An operation of selecting the module attached to the main body 12 and removing the same will now be explained. FIG. 6 is a flowchart of the module removal. The application control unit 530G reads and executes the program corresponding to the process described in FIG. 6 to implement the operation described in FIG. 6.

When the user operates the operation/display module 30A to select the removal selection mode while the electronic device 10 is in the stand-by state, the application control unit 530G sets the operation mode of the main body 12 to the removal selection mode at S601.

At S602, the application control unit 530G displays a guidance 700 on the display unit 532A prompting selection of the module to be removed. At S603, the user selects the module to be removed by operating the operation unit of the operation/display module 30A or touching the touch panel, for example, according to the guidance 700.

At S604, the application control unit 530G determines whether the module selected at S603 is attached on the front side or back side of the electronic device 10. When the selected module is attached on the back side, the application control unit 530G displays a guidance 720 on the display unit 532A to prompt for confirmation of the module to be removed at S605. The application control unit 530G then moves to a back-side module removal step (S606).

When the application control unit 530G determines at S604 that the module selected at S603 is attached on the front side, the application control unit 530G moves to S607. At S607, the application control unit 530G determines whether the module selected at S603 is the operation/display module 30A. When the selected module is a module attached on the front side and is not the operation/display module 30A, the application control unit 530G displays the guidance 720 on the display unit 532A to prompt for confirmation of the module to be removed at S608. The application control unit 530G then moves to a front-side module removal step (S609).

When the application control unit 530G determines at S607 that the module selected at S603 is the operation/display module 30A, the application control unit 530G moves to S605. At S605, the application control unit 530G displays the guidance 720 (see FIG. 7) on the display unit 532A to prompt for confirmation of the module to be removed. The application control unit 530G then moves to a touch panel module removal step (S611).

Figure 7A:
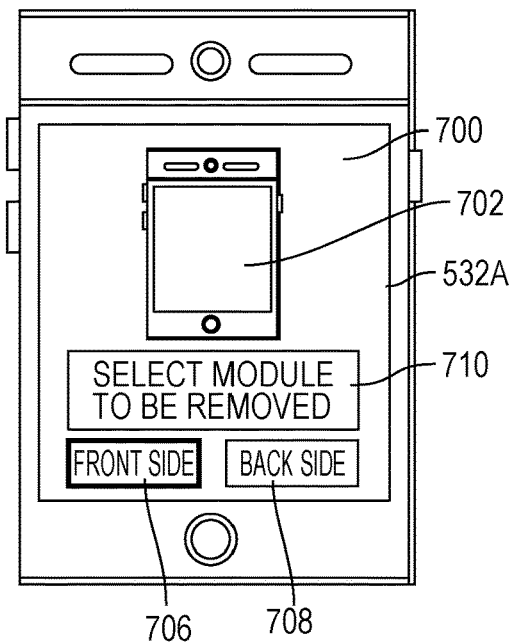
FIGS. 7A to 7D are diagrams illustrating display examples of module selection guidance.
Figure 7B:
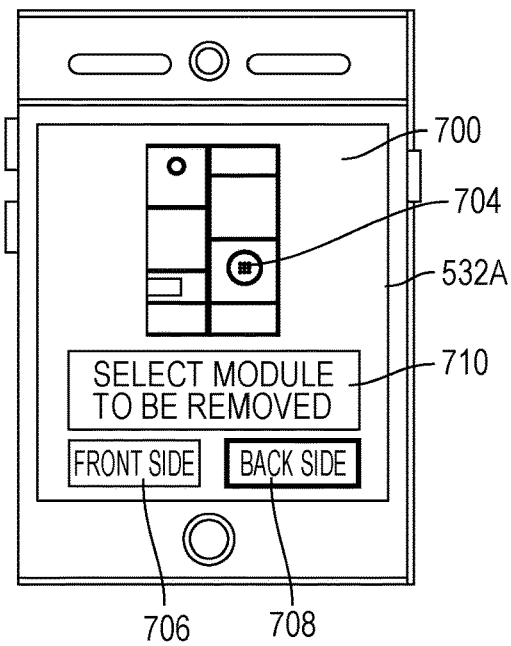
Figure 7C:
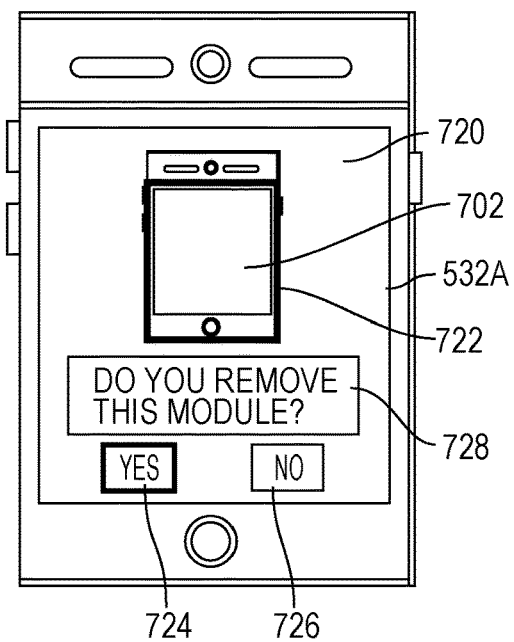
Figure 7D:
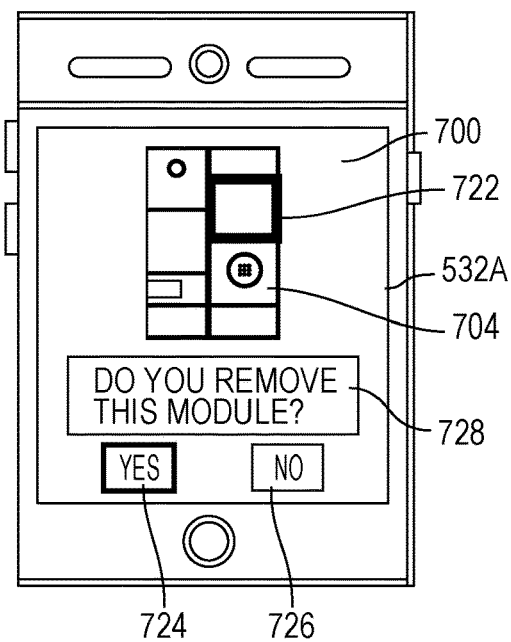

FIGS. 7A to 7D illustrate examples of the guidance displayed on the display unit 532A at the time of module removal. FIG. 7A illustrates an example of the guidance 700 displayed at S602 for the front-side module, and FIG. 7B illustrates an example of the guidance 700 displayed at S602 for the back-side modules. The display illustrated in FIG. 7A and the display illustrated in FIG. 7B can be switched by a predetermined operation. FIG. 7C illustrates an example of the guidance 720 displayed at S605, S608, and S610 for the front-side module. FIG. 7D illustrates an example of the guidance 720 displayed at S605, S608, and S610 for the back-side module. The display illustrated in FIG. 7C and the display illustrated in FIG. 7D can be switched by a predetermined operation.

As illustrated in FIGS. 7A and 7B, the guidance 700 includes whole images 702 and 704 of the electronic device 10, operation icons 706 and 708, and a message 710. The message 710 prompts the user to select the module to be removed. The user can select the display of the whole image 702 on the front side or the display of the whole image 704 on the back side by the operation icons 706 and 708.

As illustrated in FIGS. 7C and 7D, in the guidance 720, the application control unit 530G displays a frame image 722 emphasizing the module selected to be removed. The application control unit 530G displays icons 724 and 726 for confirmation or cancellation of removal and a message 728 prompting the user to confirm the module to be removed on the display unit 532A. In FIG. 7C, the operation/display module 30A is on enhanced display, and in FIG. 7D, the power supply module 30H is on enhanced display. In this example, a frame is additionally displayed along the outline of the selected module. Alternatively, the selected module can be displayed in an enlarged size or can be displayed in a blinking state.

The display contents and timings of the guidances 700 and 720 are not limited to the examples illustrated in FIGS. 6 and 7A to 7D. The display contents and timings can be changed as appropriate.

FIG. 8 is a detailed flowchart of the back-side module removal step (S606). The application control unit 530G reads and executes the program corresponding to the process described in FIG. 8 to implement the operation described in FIG. 8. In this case, the following description is based on the assumption that the user selects the power supply module 30H as a back-side module to be removed at S603.

At S801, the application control unit 530G turns on an orientation detection mode to detect the orientation of the electronic device 10 by an orientation detection unit 510. The orientation detection unit 510 detects the orientation of the electronic device 10 using the image acquired from an acceleration sensor or a camera. At S802, the application control unit 530G displays orientation change guidances 900a and 900b on the display unit 532A to prompt the user to flip the electronic device 10 from the front side to the back side.

At S803, the application control unit 530G determines whether the electronic device 10 is flipped from the front side to the back side. When the result of the detection by the orientation detection unit 510 does not indicate the back-side module removal state at S803, the application control unit 530G returns to S802 to continue to alternately display the orientation change guidances 900a and 900b on the display unit 532A. When the result of the detection by the orientation detection unit 510 indicates the back-side module removal state, that is, the state in which the back side of the electronic device 10 faces a user, the application control unit 530G moves to S804.

At S804, the application control unit 530G erases the orientation change guidance 900a and 900b from the display unit 532A. The application control unit 530G turns on the orientation detection mode at S805, and turns off the communication between the main body 12 and the selected power supply module 30H at S806. At S807, the application control unit 530G releases the power supply module 30H from the magnetic attraction to the main body 12 by the EPM 22E.

At S808, the application control unit 530G detects whether the detection (DETECT) signal indicating the attachment of the power supply module 30H is on or off. When determining at S808 that the detection (DETECT) signal is on, the application control unit 530G waits until the detection (DETECT) signal becomes off at S808. When determining at S808 that the detection (DETECT) signal becomes off, the application control unit 530G determines that the removal of the power supply module 30H is completed, and turns off the removal selection mode at S809, and then terminates the process described in FIG. 6.

After flipping the electronic device 10 from the front side to the back side, the user can forget the module to be removed. To avoid this, when the user flips again the electronic device 10 from the back side to the front side, a guidance indicative of the module to be removed is preferably displayed on the display unit 532A. Alternatively, each module can be provided with a display unit, such as an LED, so that the LED of the module selected to be removed is illuminated.

Figure 9A:
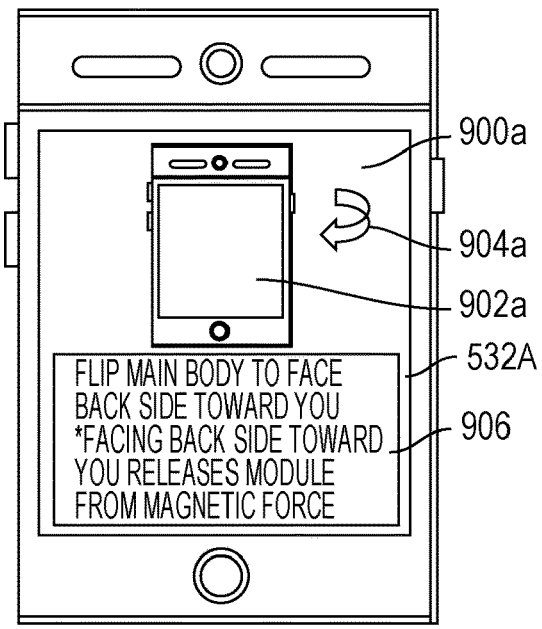
FIGS. 9A and 9B are diagrams describing orientation change guidance.
Figure 9B:
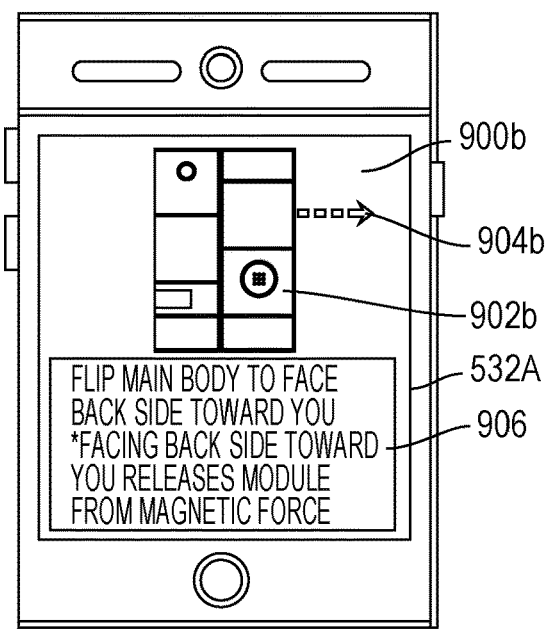
Figure 10A:
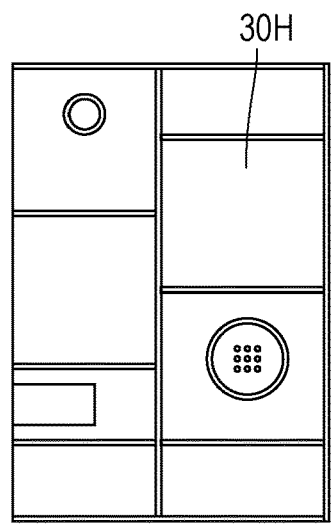
FIGS. 10A to 10C are diagrams describing a back-side module removal operation.
Figure 10B:
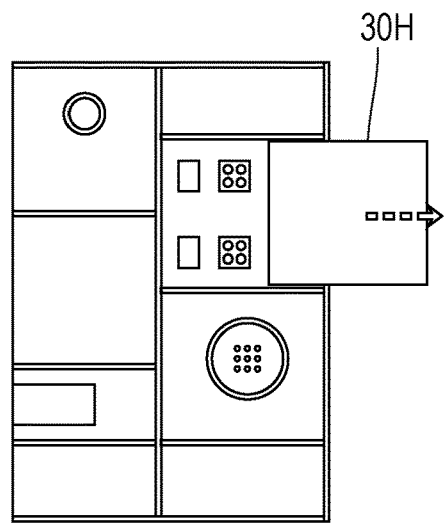
Figure 10C:
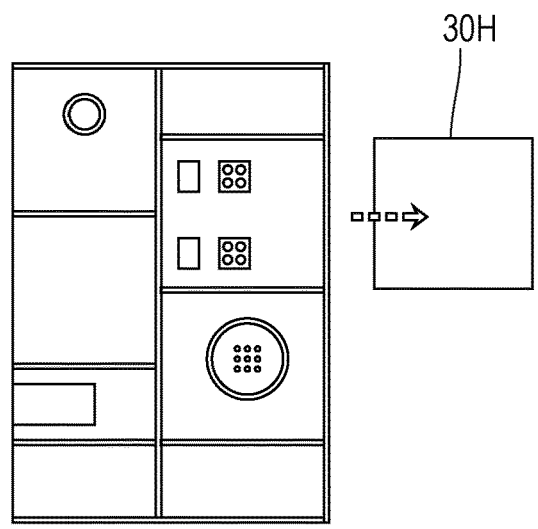

FIGS. 9A and 9B are diagrams illustrating examples of the contents of guidance in the back-side module removal routine described in FIG. 8. FIGS. 10A to 10C are schematic diagrams illustrating the module removal operation.

FIG. 9A illustrates a display example of a guidance 900a that prompts for turning the electronic device 10 into the back-side module removal state at S802. FIG. 9B illustrates a display example of a guidance 900b that indicates which of the back-side modules is to be removed at S802. The guidance 900a and the guidance 900b are alternately displayed on the display unit 532A. The guidance 900a includes a front image 902a of the electronic device 10, an indication 904a that prompts the user to flip the electronic device 10 at 180° to face the back side toward the user, and a message 906 indicating that flipping the main body releases the power supply module 30H selected to be removed from the magnetic force. The guidance 900b includes a back image 902b of the electronic device 10, an arrow 904b indicating a sliding direction in which to remove the power supply module 30H after the release from the magnetic force, and the message 906.

FIGS. 10A, 10B, and 10C illustrate a process of the user removing the power supply module 30H at S808. The user slides the power supply module 30H along the rib 18 in FIGS. 1A to 1D in the lateral direction of the main body 12 in FIGS. 1A to 1D to remove the power supply module 30H from the main body 12. In the state illustrated in FIG. 10B, the detection (DETECT) signal is turned off.

The guidance 900a and 900b illustrated in FIG. 9 are examples. The contents and timings of the guidance are not limited to the examples illustrated in FIGS. 8 and 9A and 9B. The display contents and timings can be changed as appropriate.

Figure 11:
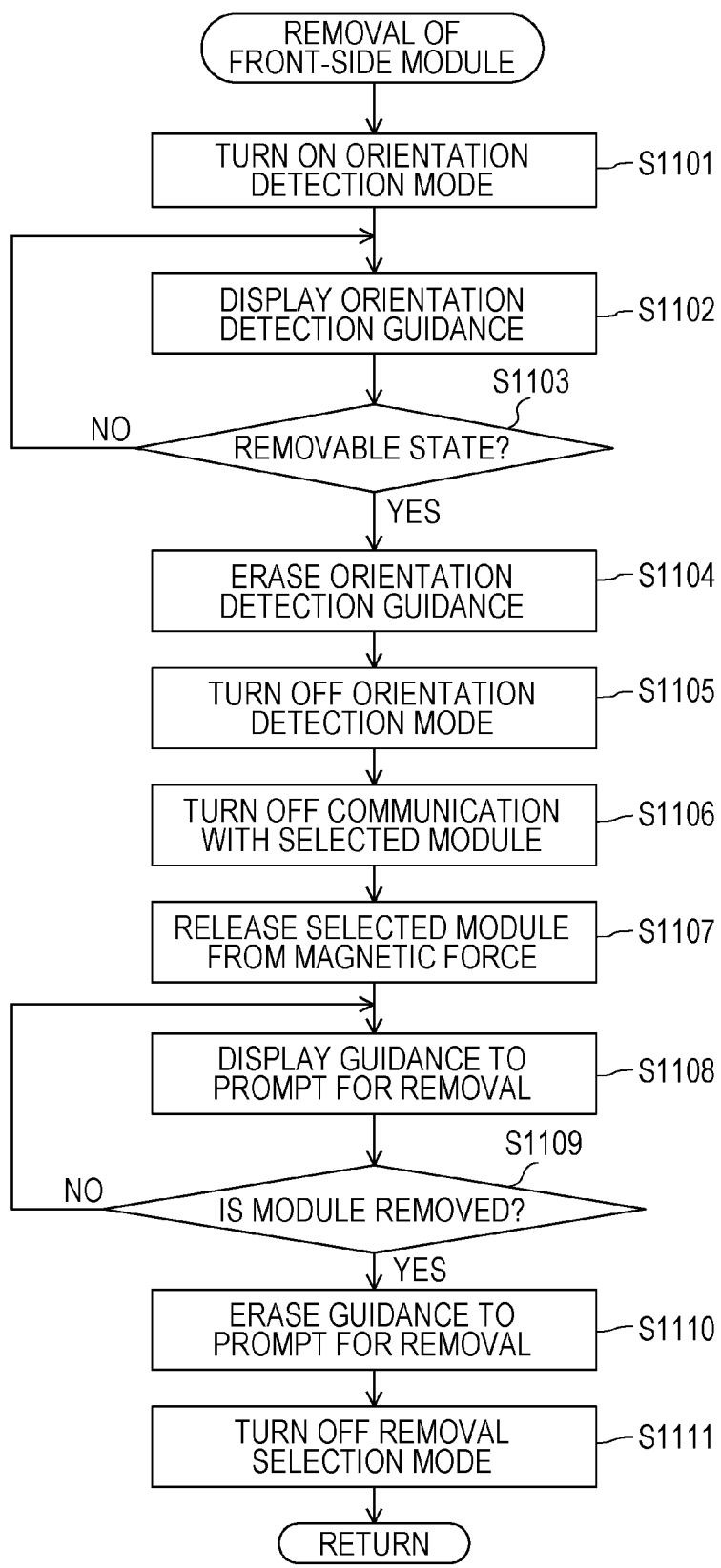
FIG. 11 is a flowchart of a front-side module removal routine.

FIG. 11 is a detailed flowchart of the front-side module removal process (S609). The application control unit 530G reads and executes the program corresponding to the process described in FIG. 11 to implement the operation described in FIG. 11. In this case, the following description is based on the assumption that the user selects the microphone/camera module 30B as a front-side module to be removed at S603.

At S1101, the application control unit 530G turns on the orientation detection mode to detect the orientation of the main body 12 by the orientation detection unit 510. At S1102, the application control unit 530G displays an orientation change guidance 1200 on the display unit 532A to prompt the user to bring the electronic device 10 into the orientation in which the front-side module is removable. At S1103, the application control unit 530G refers to the result of the detection by the orientation detection unit 510 to determine whether the front-side module is removable. When the application control 530G determines at S1103 that the electronic device 10 is not in the orientation in which the front-side module is removable, the application control unit 530G continues to display the orientation change guidance 1200 on the display unit 532A at S1102. The application control unit 530G moves to S1104 when it determines at S1103 that the electronic device 10 is in the orientation in which the front-side module is removable, that is, the front side of the electronic device 10 faces the user.

At S1104, the application control unit 530G erases the orientation change guidance 1200 from the display unit 532A. The application control unit 530G turns off the orientation detection mode at S1105, and stops the communication between the main body 12 and the microphone/camera module 30B selected to be removed at S1106. At S1107, the application control unit 530G releases the selected microphone/camera module 30B from the magnetic attraction to the main body 12 by the EPM 22B.

At S1108, the application control unit 530G displays on the display unit 532A a guidance 1206 to prompt for removal of the module 30B. At S1109, the application control unit 530G detects whether the detection (DETECT) signal indicating the attachment of the microphone/camera module 30B is on or off. When the application control unit 530G detects at S1109 that the detection (DETECT) signal is on, the application control unit 530G continues to display the guidance 1206 on the display unit 532A at S1108, and detect whether the detection (DETECT) signal is on or off at S1109.

When the application control unit 530G determines at S1109 that the detection (DETECT) signal is turned off, the application control unit 530G determines that the microphone/camera module 30B has been removed, and erases the guidance 1206 from the display unit 532A at S1110. At S1111, the application control unit 530G turns off the removal selection mode and terminates the process described in FIG. 11.

Figure 12A:
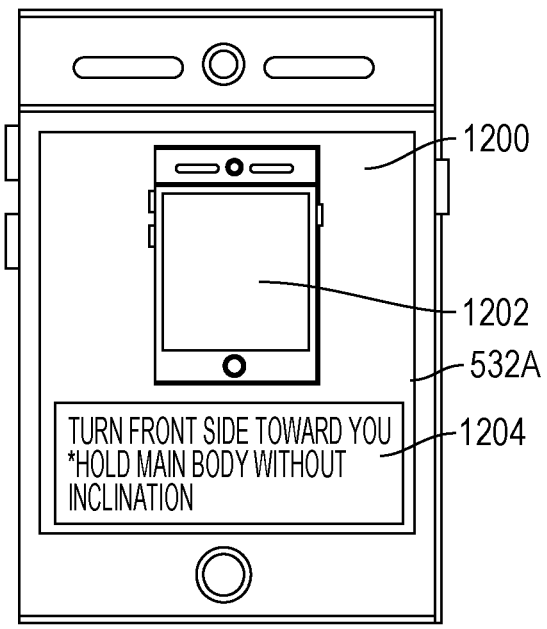
FIGS. 12A and 12B are diagrams illustrating examples of front-side module removal guidance.
Figure 12B:
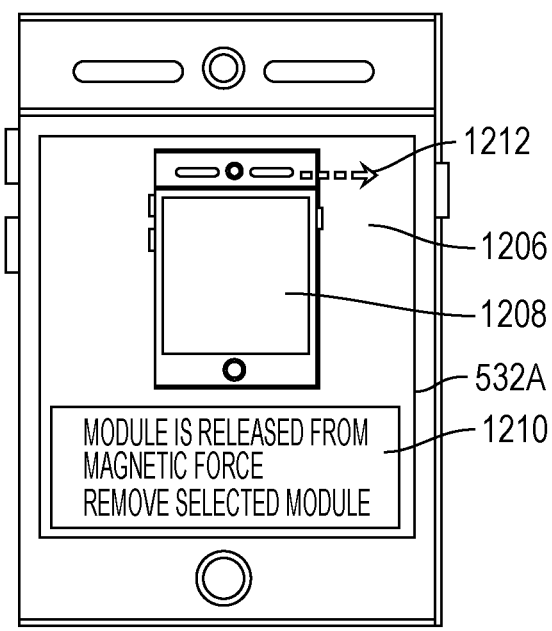
Figure 13A:
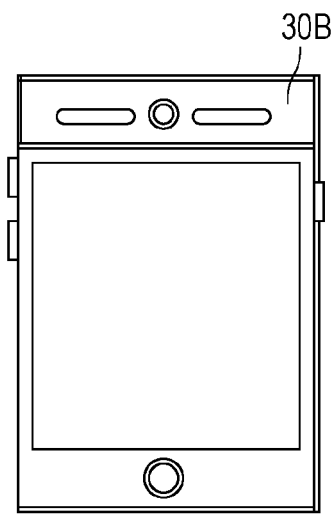
FIGS. 13A to 13C are diagrams describing a front-side module removal operation.
Figure 13B:
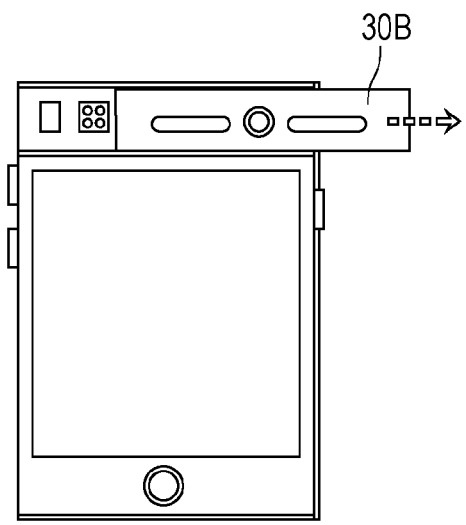
Figure 13C:
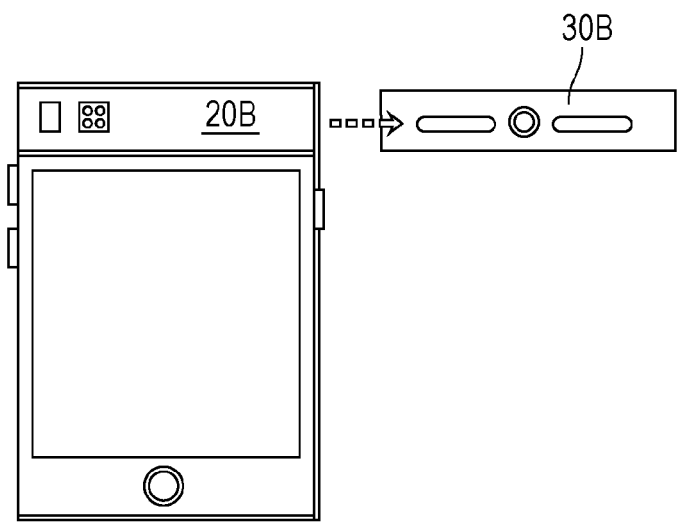

FIGS. 12A and 12B are diagrams illustrating examples of the contents of guidance in the front-side module removal routine described in FIGS. 10A to 10C. FIGS. 13A to 13C are schematic diagrams illustrating the module removal operation.

FIG. 12A illustrates the state in which the orientation change guidance 1200 is displayed on the display unit 532A to prompt the user to bring the electronic device 10 into the orientation position in which the front-side module is removable at S1102. The orientation change guidance 1200 includes a front image 1202 of the electronic device 10 and a message 1204 to prompt the user to hold the electronic device 10 without inclination.

FIG. 12B illustrates a display example of a guidance 1206 to prompt for removal of the module 30B at S1109. The guidance 1206 includes a front image 1208 of the electronic device 10, a message 1210 to prompt for removal of the module 30B, and an arrow 1212 indicating a sliding direction in which to remove the module 30B after the release from the magnetic force.

FIGS. 13A, 13B, and 13C illustrate a procedure for removing the microphone/camera module 30B. After the release from the magnetic force at S1107, the user slides the microphone/camera module 30B along the rib 14 in the lateral direction of the main body 12 to remove the module 30B from the main body 12. In the example, the microphone/camera module 30B is removed by sliding in the rightward direction of the main body 12, but can be removed by sliding in the leftward direction of the main body 12. In the intermediate state illustrated in FIG. 13B, the detection (DETECT) signal for the microphone/camera module 30B is turned off.

The guidances 1200 and 1206 are examples, and the contents and display timings of the guidance are not limited to the examples described above. The display contents and display and erasing timings of the guidance can be changed as appropriate.

FIG. 14 is a detailed flowchart of the process of removing the operation/display module 30A from the electronic device 10 (S611). The application control unit 530G reads and executes the program corresponding to the process described in FIG. 14 to implement the operation described in FIG. 14.

At S1401, the application control unit 530G turns on the orientation detection mode to detect the orientation of the main body 12 by the orientation detection unit 510. At S1402, the application control unit 530G displays an orientation change guidance 930 on the display unit 532A to prompt the user to bring the electronic device 10 into the orientation state suitable for removal of the operation/display module 30A. At S1403, the application control unit 530G determines whether the main body 12 is in the orientation in which the operation/display module is removable. When the result of the detection by the orientation detection unit 510 does not indicate that the main body 12 is in the orientation in which the operation/display module 30A is removable at S1403, the application control unit 530G returns to S1402 to continue to display the orientation change guidance 1200 on the display unit 532A. When the result of the detection by the orientation detection unit 510 indicates that the main body is in the orientation in which the operation/display module is removable at S1403, for example, when the front side of the electronic device 10 faces the user, the application control unit 530G moves to S1404.

Figure 15:
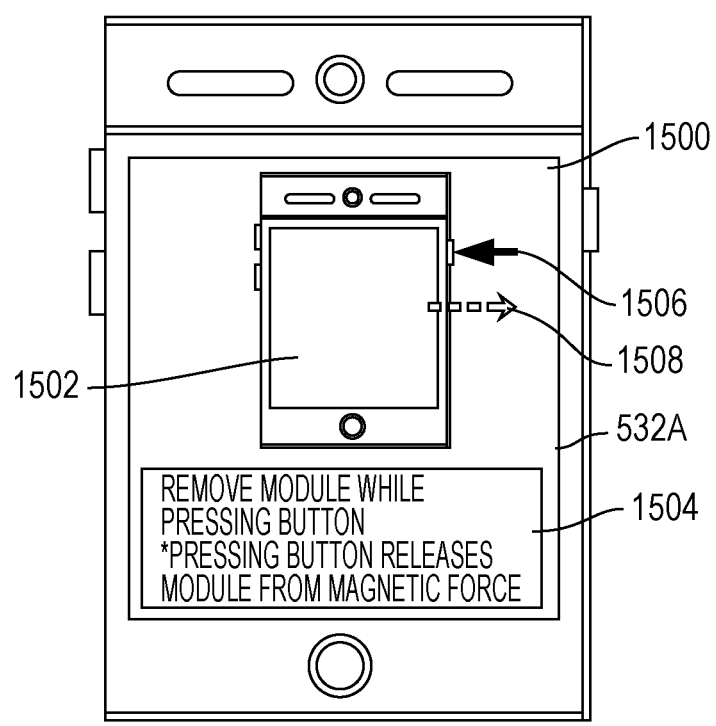
FIG. 15 is a diagram illustrating an example of an operation/display module removal guidance.

At S1404, the application control unit 530G erases the orientation change guidance 1200 from the display unit 532A. At S1405, the application control unit 530G turns off the orientation detection mode. At S1406, the application control unit 530G turns on a button input waiting mode to wait for the user's operation on the power button 36 of the operation/display module 30A. At S1407, the application control unit 530G displays on the display unit 532A a guidance 1500 to prompt for operation of the power button 36 (FIG. 15). At S1408, the application control unit 530G determines whether the user has operated the power button 36 of the operation/display module 30A. If the application control unit 530G determines at S1408 that the user has not operated the power button 36, the application control unit 530G returns to S1407 to continue to display the guidance 940 on the display unit 532A. If the application control unit 530G determines at S1408 that the user has operated the power button 36, the application control unit 530G moves to S1409.

At S1409, the application control unit 530G erases the guidance 1500 from the display unit 532A. The application control unit 530G turns off the button input waiting mode at S1410, and turns off the communication between the main body 12 and the operation/display module 30A at S1411. At S1412, the application control unit 530G releases the operation/display module 30A from the magnetic attraction to the main body 12 by the EPM 22C. At S1413, the application control unit 530G detects whether the detection (DETECT) signal indicating the attachment of the operation/display module 30A is on or off. If the application control unit 530G detects at S1413 that the detection (DETECT) signal remains on, the application control unit 530G continues to be in the state waiting for the removal of the operation/display module 30A from the main body 12 at S1413. If the application control unit 530G determines at S1413 that the detection (DETECT) signal becomes off, the application control unit 530G turns off the removal selection mode at S1414, and terminates the process described in FIG. 14.

Figure 16A:
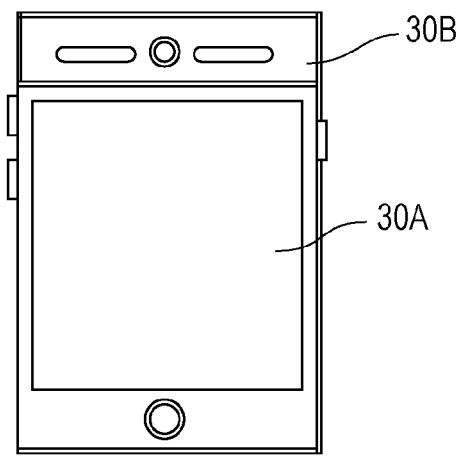
FIGS. 16A to 16C are diagrams describing an operation/display module removal operation.
Figure 16B:
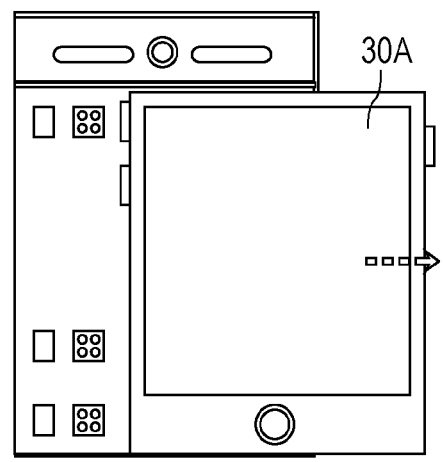
Figure 16C:
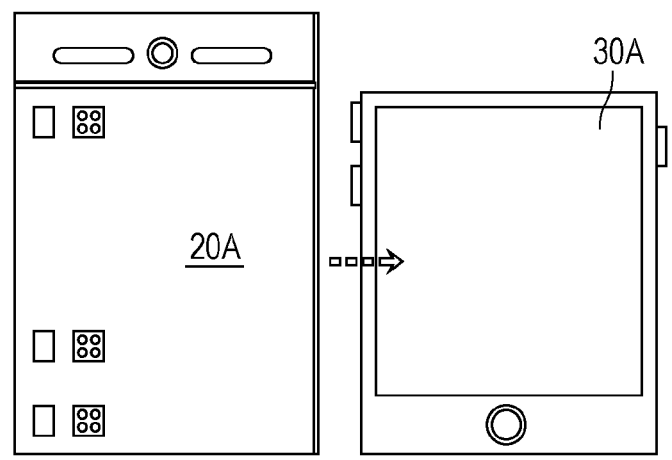

FIG. 15 is a diagram illustrating an example of display content of the guidance 1500, and FIGS. 16A to 16C are schematic diagrams describing a module removal operation. The guidance 1500 includes a front image 1502 of the electronic device 10, a message 1504 to prompt the user to release the module from the magnetic force by operating the power button 36, an arrow 1506 indicating an operating direction of the power button 36, an arrow 1508 indicating a sliding direction in which the operation/display module 30A is removed. After the button input waiting mode is turned on at S1406, the role of the power button 36 is changed. The power button 36 is generally intended to power on and off the electronic device 10, but in the button input waiting mode, the power button 36 acts as an operation member that releases the operation/display module 30A from the magnetic force of attracting to the main body 12.

FIGS. 16A, 16B, and 16C illustrate a procedure for removing the operation/display module 30A. After the release from the magnetic force at S1412, the user slides the operation/display module 30A along the rib 14 in the lateral direction of the main body 12 to remove the operation/display module 30A from the main body 12.

In the example, the operation/display module 30A is removed from the main body 12 by sliding in the rightward direction of the main body 12, but can be removed by sliding in the leftward direction of the main body 12. In the state illustrated in FIG. 16B, the detection (DETECT) signal is turned off.

The guidance 1500 illustrated in FIG. 15 is an example, and the content and display and erasing timings of the guidance are not limited to the example described above. The display content and display and erasing timings of the guidance can be changed as appropriate.

EXAMPLE 2

To remove the operation/display module 30A from the main body 12, the simultaneous operation of the power button 36 and the volume adjustment button 38 positioned on the both sides of the main body 12 viewed from the removing direction can be the operation of releasing the operation/display module 30A from the magnetic force of attracting to the main body 12. At this time, the application control unit 530G displays a guidance 1700 illustrated in FIG. 17 on the display unit 532A instead of the guidance 940.

Figure 17:
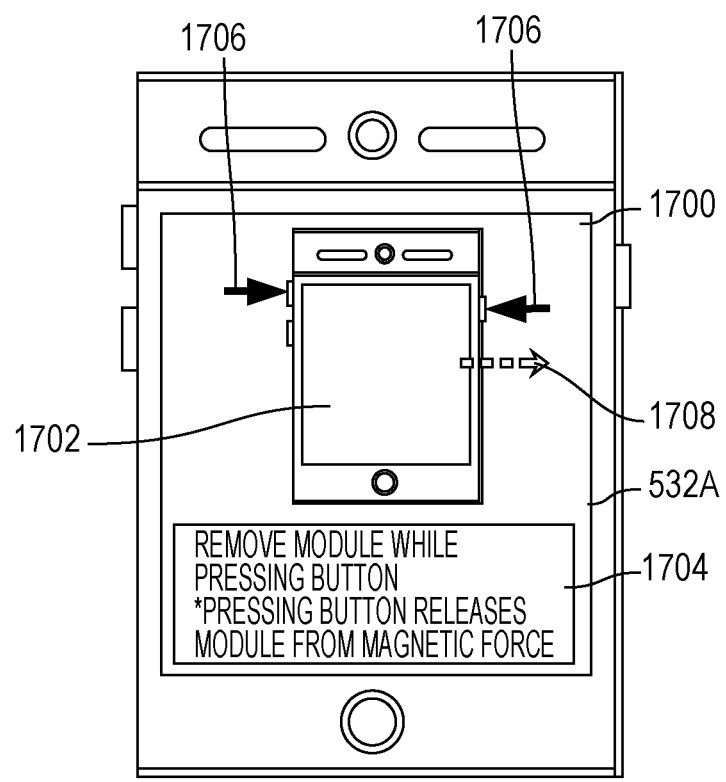
FIG. 17 is a diagram illustrating a second operation for removal of the operation/display module and a guidance example.

FIG. 17 illustrates a display example of the guidance 1700 displayed by the application control unit 530G on the display unit 532A after the button input waiting mode is turned on at S1406. The guidance 1700 includes a front image 1702 of the electronic device 10, a message 1704 describing the user operation, arrows 1706 indicating an operating direction of the power button 36 and the volume adjustment button 38, and an arrow 1708 indicating a sliding direction in which the operation/display module 30A is removed.

After the button input waiting mode is turned on at S1406, the roles of the power button 36 and the volume adjustment button 38 in the operation/display module 30A are changed. In general, the power button 36 is operated to power on and off the electronic device 10 and the volume adjustment button 38 is operated to adjust the volume. After the button input waiting mode is turned on, the user simultaneously operates the power button 36 and the volume adjustment button 38 in the arrows 1706 indicating the operating direction. According to the simultaneous operation, the application control unit 530G releases the operation/display module 30A from the magnetic force of attracting to the main body 12.

The guidance 1700 illustrated in FIG. 17 is an example, and the content and display and erasing timings of the guidance are not limited to the example described above. The display content and display and erasing timings of the guidance can be changed as appropriate.

EXAMPLE 3

To remove the operation/display module 30A from the main body 12, the operation of the home button 34 can be the operation of releasing the operation/display module 30A from the magnetic force of attracting to the main body 12. At this time, the application control unit 530G displays a guidance 1800 illustrated in FIG. 18 on the display unit 532A instead of the guidance 940.

Figure 18:
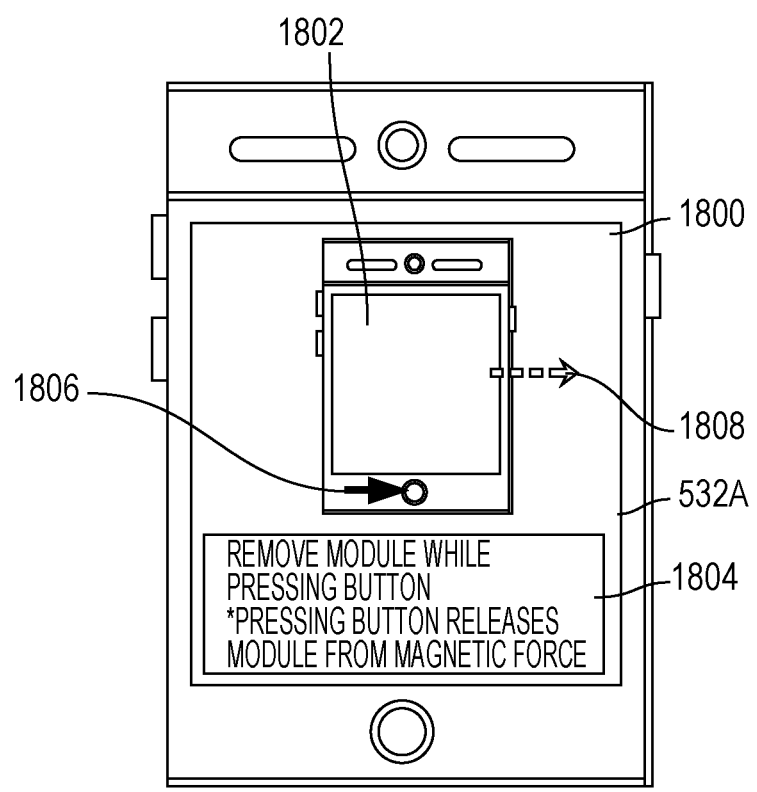
FIG. 18 is a diagram illustrating a third operation for removal of the operation/display module and a guidance example.

FIG. 18 illustrates a display example of the guidance 1800 displayed by the application control unit 530G on the display unit 532A after the button input waiting mode is turned on at S1406. The guidance 1800 includes a front image 1802 of the electronic device 10, a message 1804 describing the user operation, an arrow 1806 indicating an operating direction of the home button 34, and an arrow 1808 indicating a sliding direction in which the operation/display module 30A is removed.

After the button input waiting mode is turned on at S1406, the role of the home button 34 in the operation/display module 30A is changed. In general, the home button 34 is used to switch between the contents to be displayed on the display unit 532A. After the button input waiting mode is turned on, the user operates the home button 34. According to the operation of the home button 34, the application control unit 530G releases the operation/display module 30A from the magnetic force of attracting to the main body 12.

The guidance 1800 illustrated in FIG. 18 is an example, and the content and display and erasing timings of the guidance are not limited to the example described above. The display content and display and erasing timings of the guidance can be changed as appropriate.

EXAMPLE 4

To remove the operation/display module 30A from the main body 12, the slide operation of the manner button 40 may be the operation of releasing the operation/display module 30A from the magnetic force of attracting to the main body 12. At this time, the application control unit 530G displays a guidance 1900 illustrated in FIG. 19 on the display unit 532A, instead of the guidance 940.

Figure 19:
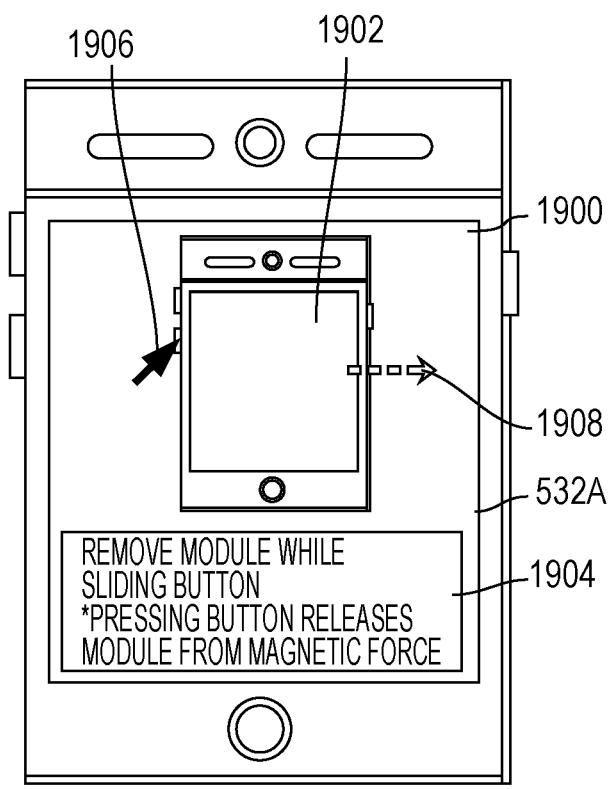
FIG. 19 is a diagram illustrating a fourth operation for removal of the operation/display module and a guidance example.
Figure 20A:
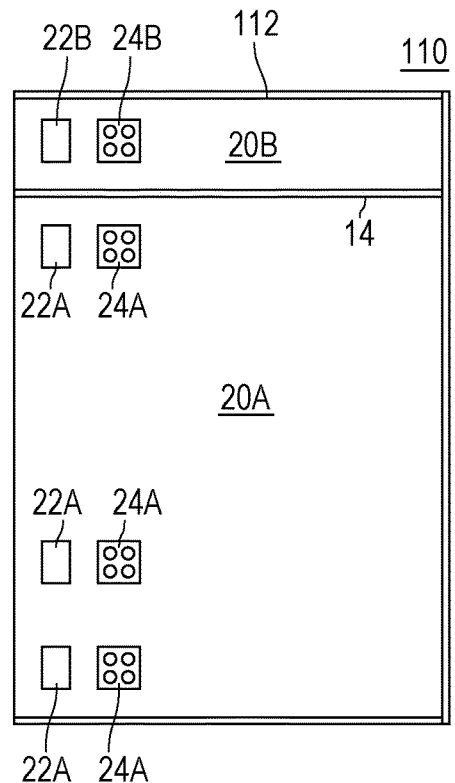
FIGS. 20A to 20D are planar views of a main body and a configuration after module attachment according to Example 5.
Figure 20B:
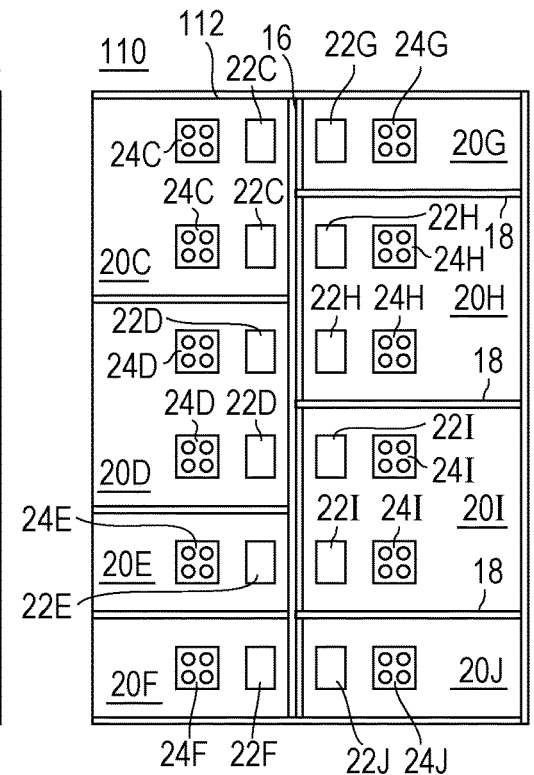
Figure 20C:
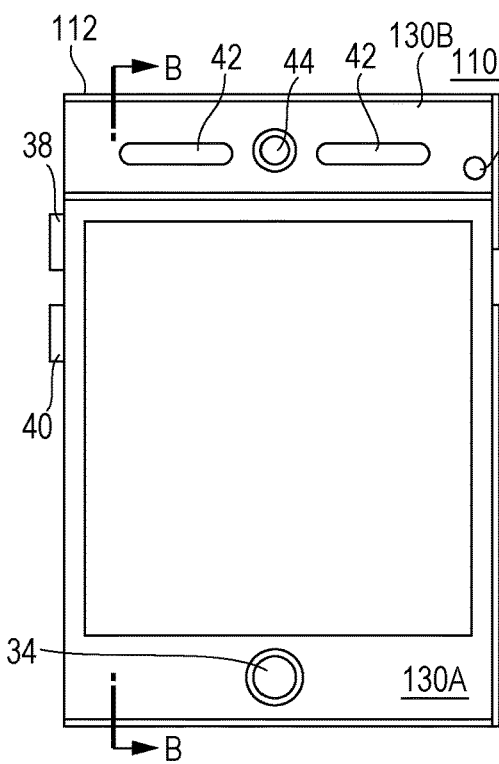
Figure 20D:
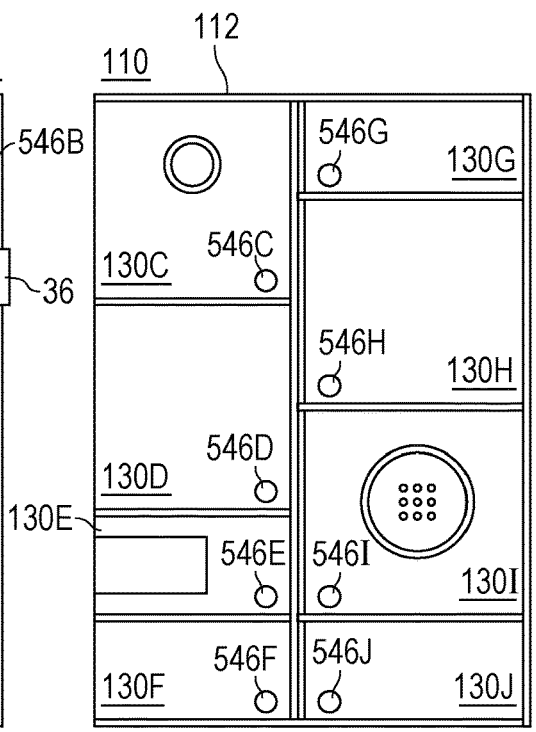

FIG. 19 illustrates a display example of the guidance 1900 displayed by the application control unit 530G on the display unit 532A after the button input waiting mode is turned on at S1406. The guidance 1900 includes a front image 1902 of the electronic device 10, a message 1904 describing the user operation, an operating direction 1906 of the manner button 40, and a sliding direction 1908 in which the operation/display module 30A is removed.

After the button input waiting mode is turned on at S1406, the role of the manner button 40 in the operation/display module 30A is changed. In general, the manner button 40 is used to switch between turning on and off the mute setting. After the button input waiting mode is turned on, the user slides the manner button 40 in the direction vertical to the module removal direction. According to the slide operation, the application control unit 530G releases the operation/display module 30A from the magnetic force of attracting to the main body 12.

The guidance 1900 illustrated in FIG. 19 is an example, and the content and display and erasing timings of the guidance are not limited to the example described above. The display content and display and erasing timings of the guidance can be changed as appropriate.

EXAMPLE 5

An electronic device 110 using LEDs for the modules to display the added attachment state will now be explained. FIGS. 20A to 20D are configuration diagrams corresponding to FIGS. 1A to 1D, and FIG. 21 is a schematic configuration block diagram corresponding to FIG. 5. The same components as the components described above with reference to FIGS. 1A to 4B have the same reference signs as those of the components described above.

A main body 112 of the electronic device 110 includes an acceleration sensor 511 in addition to the components of the main body 12. The output of the acceleration sensor 511 connects to a system control unit 502.

Figure 21:
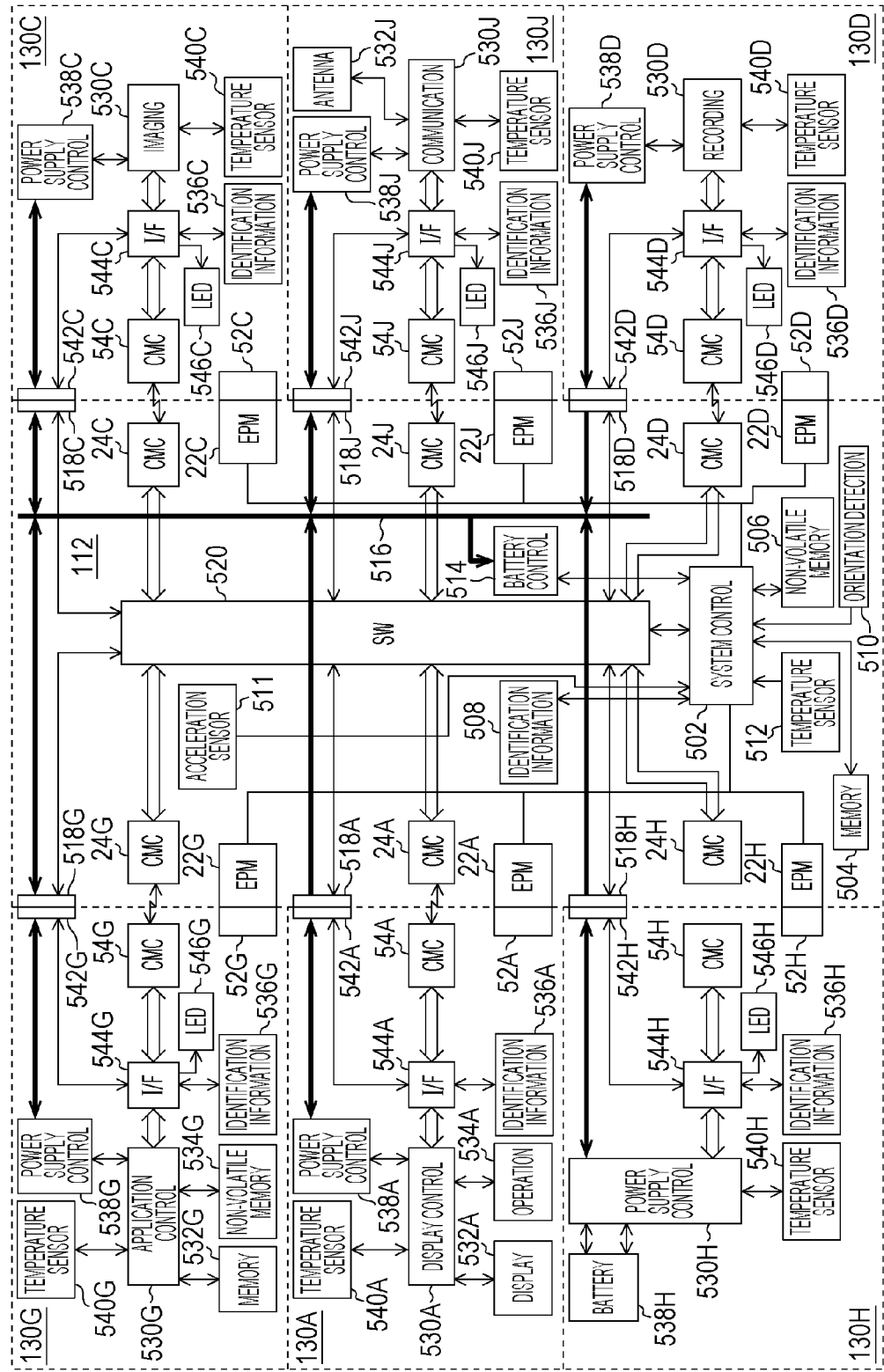
FIG. 21 is a schematic block diagram of the example illustrated in FIGS. 20A to 20D.

Modules 130A to 130J correspond to the modules 30A to 30J, respectively. The modules 130B to 130J include LEDs 546B to 546J, which enable the user to visually check the respective turn-on, turn-off, and blinking statuses provided by these modules. As illustrated in FIG. 21, in the modules 130B to 130J, units 530B to 530J control the turn-on, turn-off, and blinking of the LEDs 546B to 546J via interfaces 544B to 544J. If luminescent colors are selected for the LEDs 546A to 546J, the units 530B to 530J also control the luminescent colors.

Figure 22:
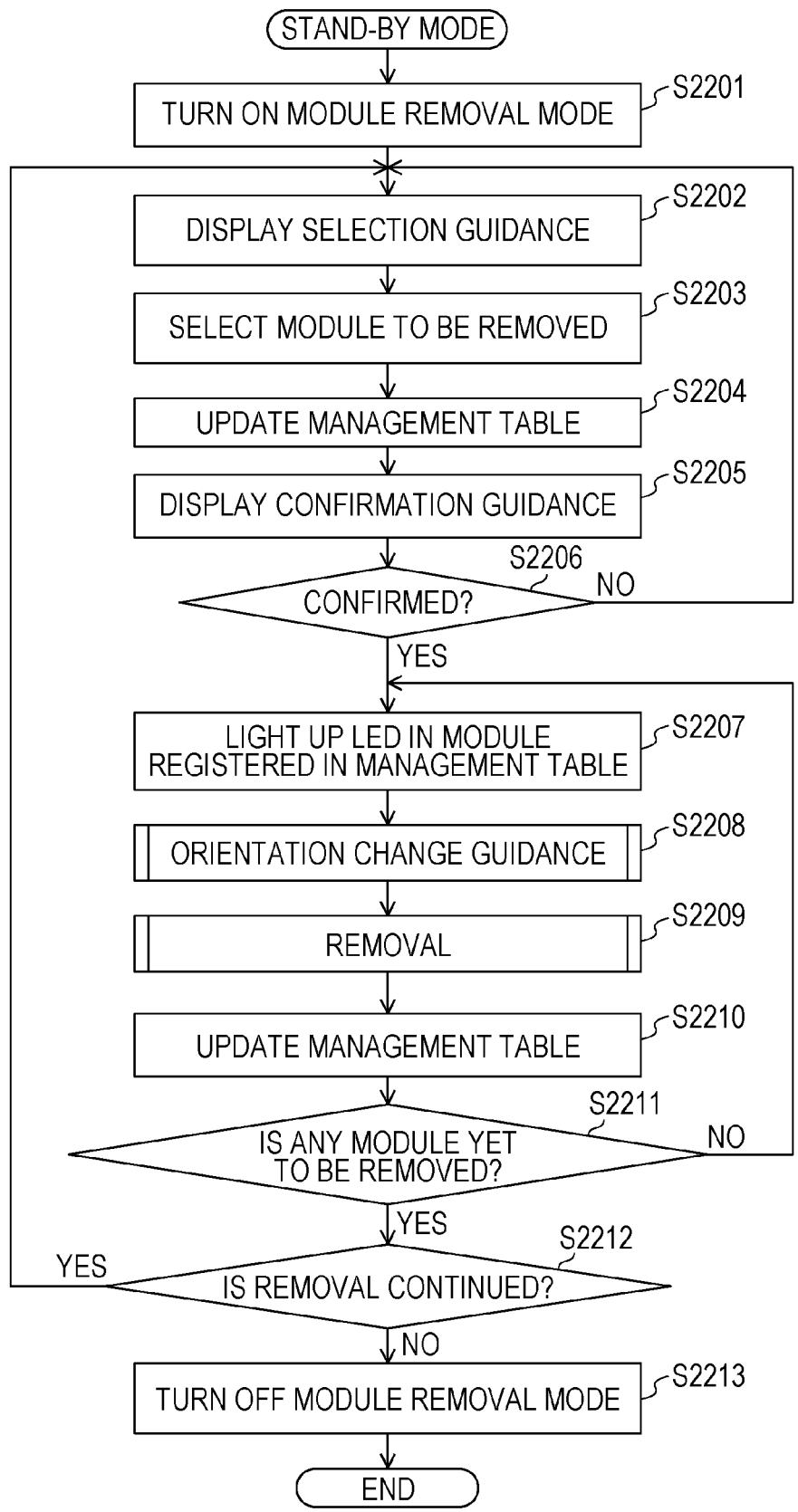
FIG. 22 is a flowchart of operations in a stand-by mode.

FIG. 22 is a flowchart illustrating the operation of removing any one of the modules 130A to 130J from the electronic device 110. The application control unit 530G of the application control module 130G reads and executes the program corresponding to the process described in FIG. 22 to implement the operation described in FIG. 22.

When the user operates the operation/display module 130A to select the removal selection mode while the electronic device 110 is in the stand-by state, the application control unit 530G sets the operation mode of the main body 12 to the removal selection mode at S2201.

At S2202, the application control unit 530G displays on the display unit 532A a guidance 2300 to prompt for selection of the module to be removed (FIGS. 23A to 23D). At S2203, the user operates the operation unit in the operation/display module 130A according to the guidance 2300 to select the module to be removed. In this example, the user selects the microphone/camera module 130B, the recording module 130D, the I/O module 130E, the NFC module 130F, the power supply module 130H, and the communication module 130J.

At S2204, the application control unit 530G registers the modules selected by the user at S2203 in a management table 2400 (FIG. 24) in the non-volatile memory 534G. At S2205, the application control unit 530G displays on the display unit 532A a confirmation guidance 2320 to confirm the selection of the modules to be removed (FIGS. 23A to 23D). At S2206, the application control unit 530G determines the user's confirmation of the modules to be removed. When the user has not confirmed the selection, the application control unit 530G returns to S2202. When the user has confirmed the selection, the application control unit 530G moves to S2207.

At S2207, the application control unit 530G turns on the LEDs in the modules registered in the management table 2400. When the modules 130B, 130D, 130E, 130F, 130H, and 130J are selected at S2203, the LEDs 546B, 546D, 546E, 546F, 546H, and 546J illuminate.

At step S2208, the application control unit 530G prompts the user to turn the main body 12 to a desired orientation in an orientation change guidance routine. The orientation change guidance routine (S2208) is described below.

At S2209, the application control unit 530G prompts the user to remove the selected modules. A removal routine (S2209) is described below. At S2210, the application control unit 530G deletes the modules removed at S2209 from the management table 2400 in the non-volatile memory 534G. At S2211, the application control unit 530G determines whether any module still needs to be removed from the management table 2400. If there is still any modules left in the management table 2400, the application control unit 530G returns to S2207. If there are no longer any modules left in the management table 2400, the application control unit 530G moves to S2212.

At step S2212, the application control unit 530G prompts the user to select whether to continue the module removal. When the user selects to continue the module removal, the application control unit 530G returns to S2202. When the user does not select to continue, the application control unit 530G moves to step S2213. At S2213, the application control unit 530G turns off the module removal mode and terminates the process described in FIG. 22.

Figure 23A:
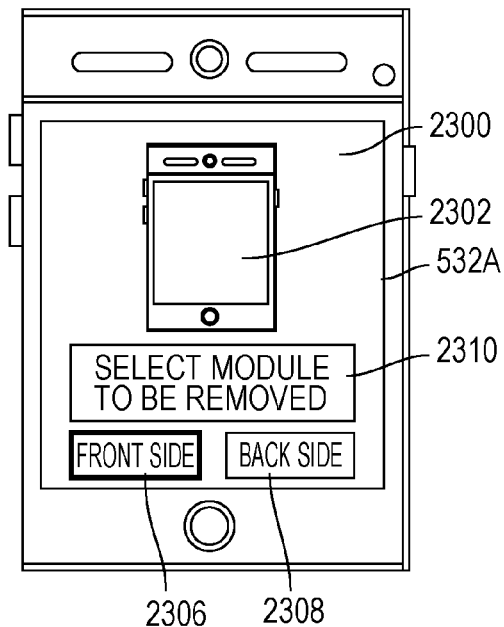
FIGS. 23A to 23D are diagrams describing selection guidance to prompt for selection of modules to be removed.
Figure 23B:
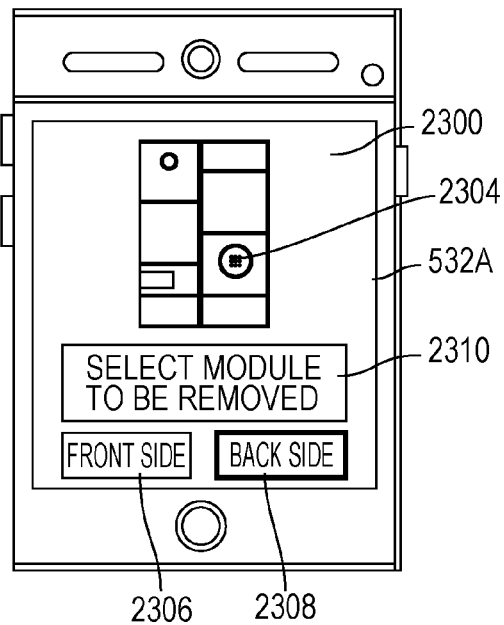
Figure 23C:
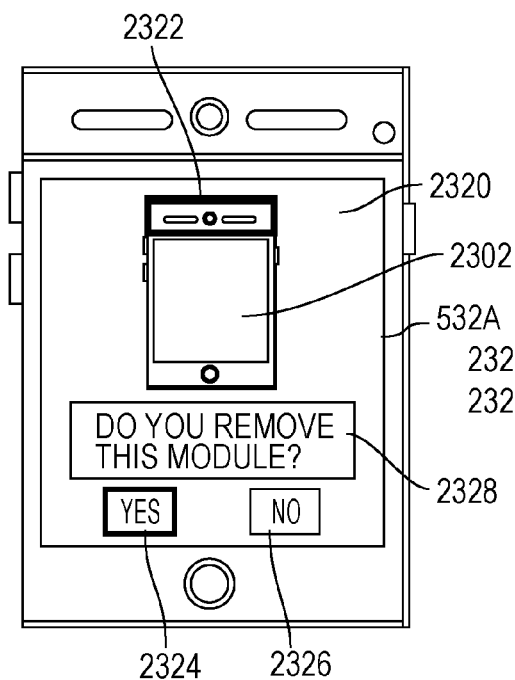
Figure 23D:
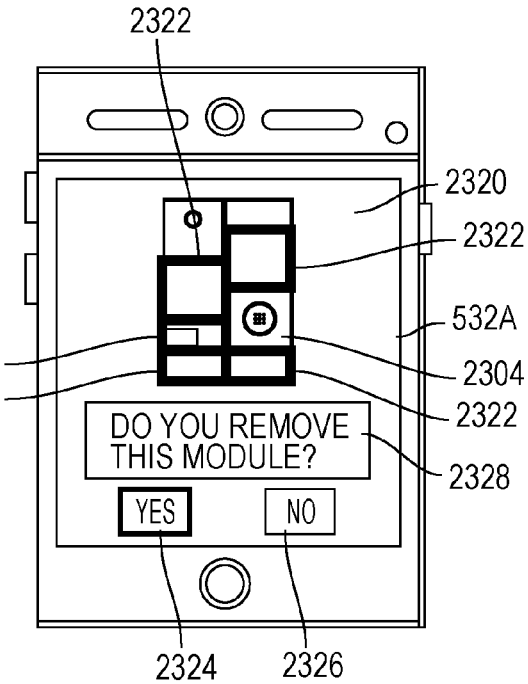

FIGS. 23A and 23B illustrate display examples of the selection guidance 2300 displayed at S2202, and FIGS. 23C and 23D illustrate display examples of the confirmation guidance 2320 displayed at S2205. The display illustrated in FIG. 23A and the display illustrated in FIG. 23B are switchable by a predetermined operation. FIG. 23C illustrates a display example of the confirmation guidance 2320 displayed for the front-side module at S2205, and FIG. 23D illustrates a display example of the guidance 2320 displayed for the back-side module at S2205. The display illustrated in FIG. 23C and the display illustrated in FIG. 23D are switchable by a predetermined operation.

As illustrated in FIGS. 23A and 23B, the selection guidance 2300 includes whole images 2302 and 2304 of the electronic device 10, operation icons 2306 and 2308, and a message 2310. The message 2310 prompts the user to select the module to be removed. The user can select whether to display the front-side whole image 2302 or the back side whole image 2304 by the operation icons 2306 and 2308.

As illustrated in FIGS. 23C and 23D, the application control unit 530G displays a frame image 2322 for emphasis of the module selected to be removed in the guidance 2320. The application control unit 530G displays on the display unit 532A icons 2324 and 2326 to confirm the removal, and a message 2328 to prompt the user to confirm the module to be removed. FIG. 23C illustrates the microphone/camera module 130B displayed in an emphasized manner by the frame image 2322. FIG. 23D illustrates the modules 130D, 130E, 130F, 130H, and 130J displayed in an emphasized manner by the frame image 2322. In this example, the frames are added along the outlines of the selected modules. Alternatively, the selected modules can be displayed in enlarged sizes or in a blinking manner.

The contents and timings of the guidances 2300 and 2320 are not limited to the examples illustrated in FIGS. 22 and 23A to 23D. The display contents and timings can be changed as appropriate.

Figure 24:
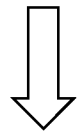
FIG. 24 is a configuration diagram of a management table for use in the management of modules to be removed.

FIG. 24 illustrates an example of a configuration of the management table 2400 and the contents of the management table 2400. The management table 2400 includes a field 2402 in which the front-side modules are registered, a field 2404 in which the back-side left modules are registered, and a field 2406 in which the back-side right modules are registered. In the example described in FIG. 24, the state before the selection of the module to be removed is illustrated on the upper side, and the state after the selection is illustrated on the lower side. As illustrated on the lower side of FIG. 24, the information for identifying the module selected to be removed at S2203 is stored in the management table 2400. In FIG. 24, the names of the modules are stored for easy understanding, but in actuality, the modules are identified by their respective identification information.

Figure 25:
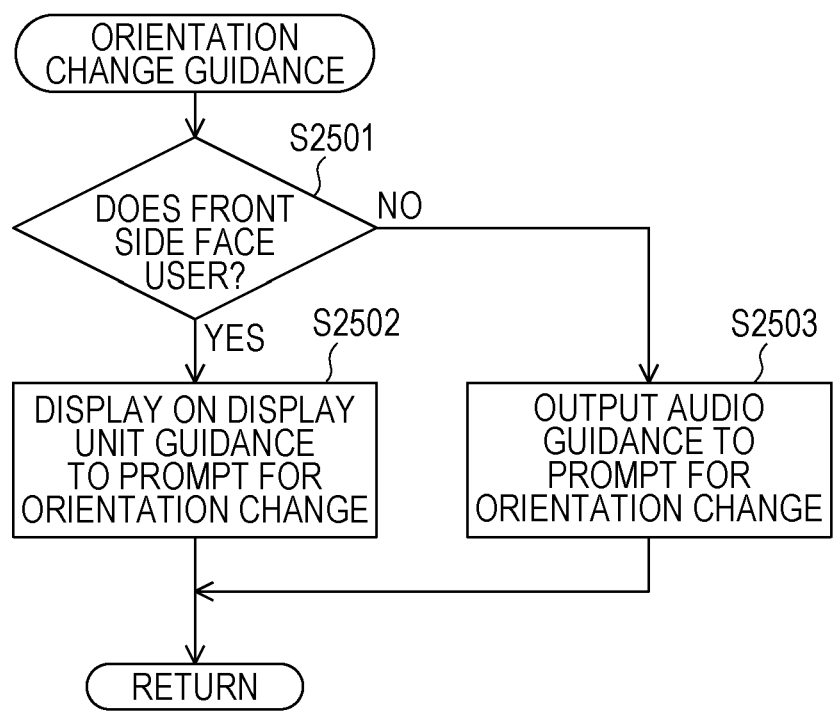
FIG. 25 is a flowchart of an operation of outputting orientation change guidance.

FIG. 25 is a detailed flowchart of the orientation change guidance routine (S2208). The application control unit 530G of the application control module 130G reads and executes the program corresponding to the process described in FIG. 25 to implement the operation described in FIG. 25.

At S2501, the application control unit 530G determines whether the front side of the electronic device 110 faces the user by an orientation value or an orientation direction detected by the orientation detection unit 510. The application control unit 530G can make the orientation determination by using the output of the acceleration sensor 511 and the image captured by either the microphone/camera module 130B or the camera module 130C.

The application control unit 530G moves to S2502 if it determines at S2501 that the front side of the electronic device 110 faces the user. At S2502, the application control unit 530G displays on the display unit 532A an orientation change guidance 2600*a*, 2600*b*, 2700*a*, 2700*b*, or 2800 (FIGS. 26A and 26B, 27A and 27B, and 28) according to the contents of the management table 2400. The application control unit 530G then terminates the orientation change guidance routine described in FIG. 25, and returns to the calling source.

The application control unit 530G moves to S2502 if it does not determine at step S2501 that the front side of the electronic device 110 faces the user. At S2503, the application control unit 530G, based on the contents of the management table 2400, outputs an audio guidance from the speaker module 130I to prompt the user to change the orientation of the electronic device 110. This is because, when the front side of the electronic device 110 does not face the user, it is difficult for the user to view the screen on the display unit 532A. After S2503, the application control unit 530G terminates the orientation change guidance routine described in FIG. 25 and returns to the calling source.

The audio guidance output at S2503 can be, for example, "Face the front side of the main body toward you," "Turn the left back side upward," "Turn the right back side upward," or the like. The content of the audio guidance can be any content other than the foregoing examples or can just be an audible sound such as a beep. The guidance can also be non-audio in nature, such as a vibration.

According to the control described in FIG. 25, a message for a removal operation is displayed on the display for the removal of the module on the front side of the main body 12, and an audio message of the same content is output for the removal of the module on the back side of the main body 12.

FIGS. 26A and 26B, 27A and 27B, and 28 illustrates examples of the orientation change guidance displayed on the display unit 532A at S2502.

Figure 26A:
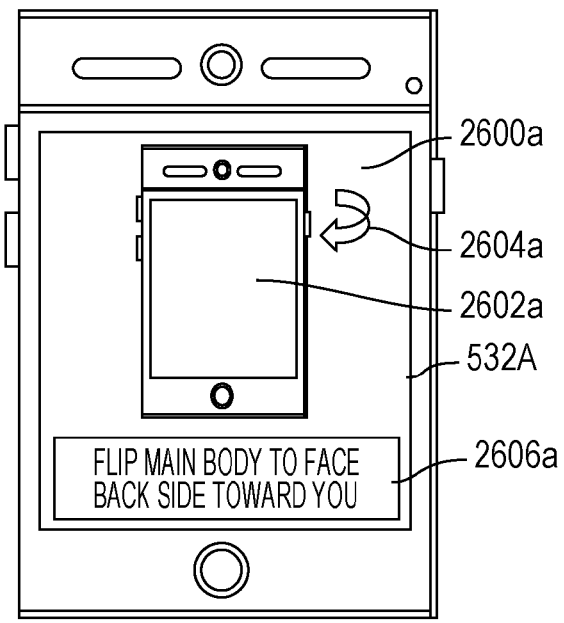
FIGS. 26A and 26B are schematic diagrams illustrating examples of orientation change guidance described in FIG. 25.
Figure 26B:
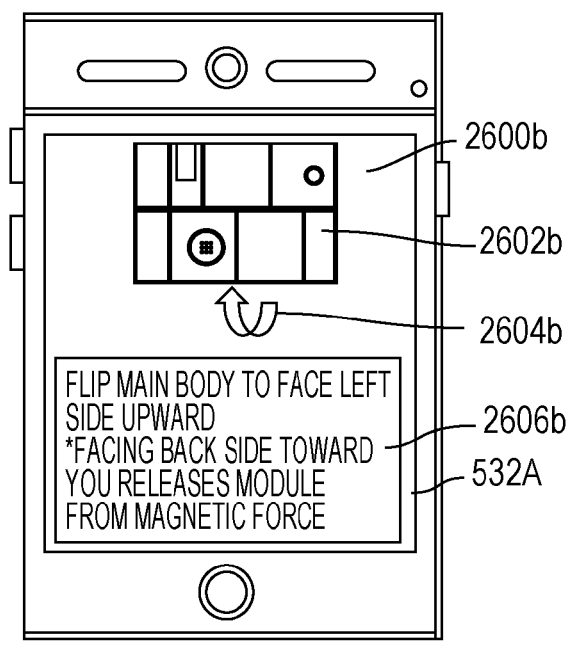

FIGS. 26A and 26B illustrate the orientation change guidances 2600*a* and 2600*b* to prompt the user to turn the electronic device 110 into the back-side left module removal state. FIG. 26A illustrates the orientation change guidance 2600*a* to prompt for changing the orientation of the electronic device 110 from the front side to the back side. FIG. 26B illustrates the orientation change guidance 2600*b* to prompt for bringing the electronic device 110 with the back side facing the user into the back-side left module removal state. The guidance 2600*a* and the guidance 2600*b* are alternately displayed on the display unit 532A. The orientation change guidance 2600*a* includes a front image 2602*a* of the electronic device 110, an indication 2604*a* to prompt the user to flip the electronic device 110 180° to face the back side of the electronic device 110 toward the user, and a message 2606*a* to prompt for flipping the main body. The guidance 2600*b* includes a back image 2602*b* of the electronic device 110, an indication 2604*b* to prompt for turning the left back side upward, and a message 2606*b* to prompt for holding the electronic device 110 with the left back side upward without inclination.

Figure 27A:
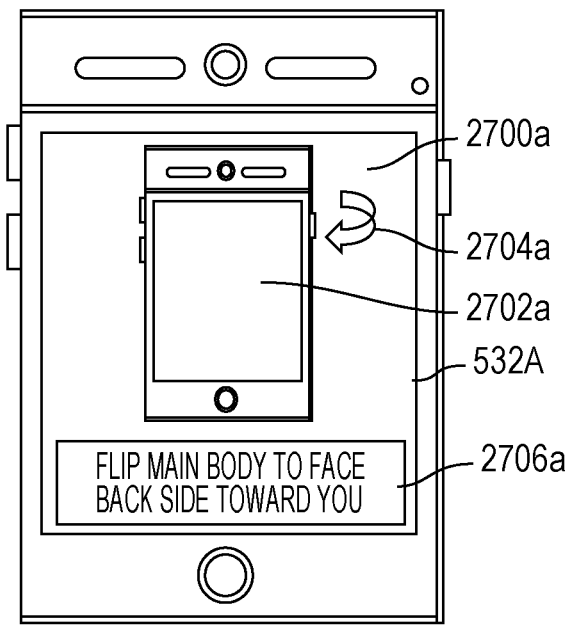
FIGS. 27A and 27B are schematic diagrams illustrating examples of orientation change guidance described in FIG. 25.
Figure 27B:
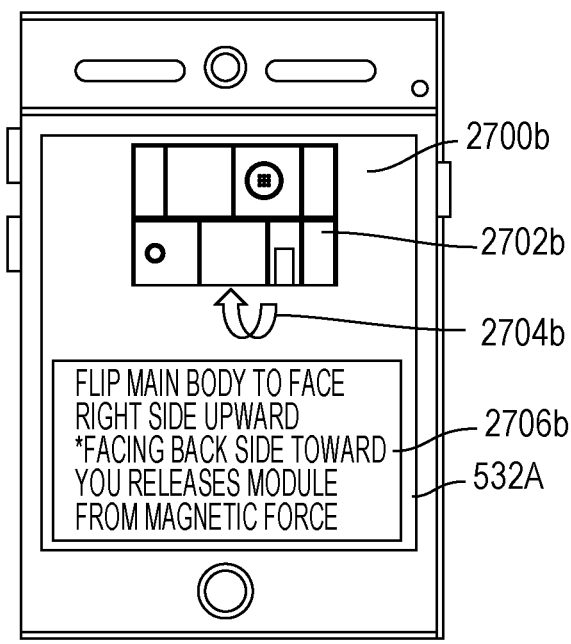

FIGS. 27A and 27B illustrate the orientation change guidances 2700*a* and 2700*b* to prompt for turning the electronic device 110 into the back-side right module removal state. FIG. 27A illustrates the orientation change guidance 2700*a* to prompt for changing the orientation of the electronic device 110 from the front side to the back side. FIG. 27B illustrates the orientation change guidance 2700*b* to prompt for bringing the electronic device 110 with the back side facing the user into the back-side right module removal state. The guidance 2700*a* and the guidance 2700*b* are alternately displayed on the display unit 532A. The orientation change guidance 2700*a* includes a front image 2702*a* of the electronic device 110, an indication 2704*a* to prompt the user to flip the electronic device 110 180° to face the back side of the electronic device 110 toward the user, and a message 2706*a* to prompt for flipping the main body. The guidance 2700*b* includes a back image 2702*b* of the electronic device 110, an indication 2704*b* to prompt for turning the right back side upward, and a message 2706*b* to prompt for holding the electronic device 110 with the right back side upward without inclination.

Figure 28:
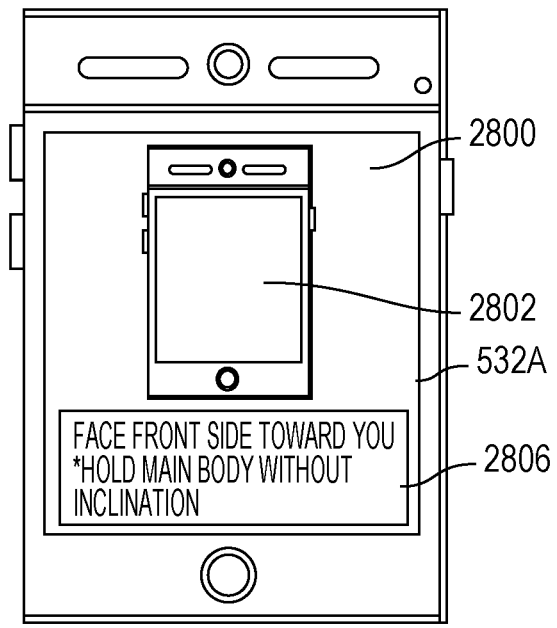
FIG. 28 is a schematic diagram illustrating an example of orientation change guidance described in FIG. 25.

FIG. 28 illustrates the orientation change guidance 2800 to prompt for bringing the electronic device 110 into the front-side module removal state. The guidance 2800 includes a front image 2802 of the electronic device 110 and a message 2806 to prompt for holding the electronic device 110 without inclination.

Providing the orientation change messages as illustrated in FIGS. 26A and 26B, 27A and 27B, and 28 to the user enables the user to appropriately change the orientation of the electronic device 110 according to the module to be removed.

The orientation change guidances 2600a, 2600b, 2700a, 2700b, and 2800 are examples. The contents and timings of the guidances are not limited to the examples illustrated in FIGS. 26A and 26B, 27A and 27B, and 28. The display contents and timings can be changed as appropriate.

Figure 29:
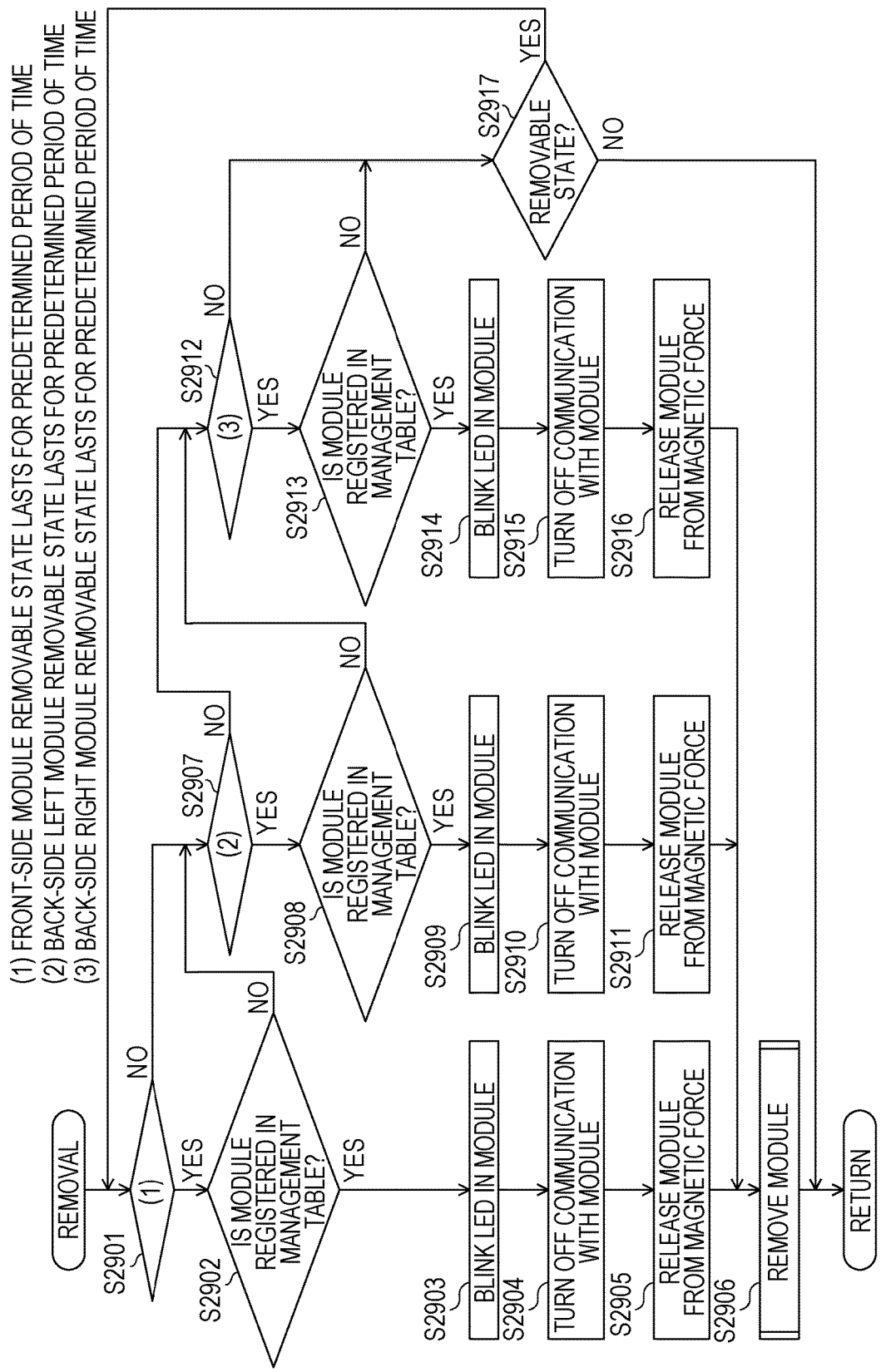
FIG. 29 is a flowchart of the removal routine described in FIG. 22.

FIG. 29 is a detailed flowchart of the removal routine (S2209). The application control unit 530G of the application control module 130G reads and executes the program corresponding to the process described in FIG. 29 to implement the operation described in FIG. 29.

At S2901, the application control unit 530G determines, based on the output of the detection by the orientation detection unit 510, whether the electronic device 110 is in the front-side module removable state for a predetermined period of time. When the front-side module removable state lasts for the predetermined period of time, the application control unit 530G moves to step S2902, otherwise, the application control unit 530G moves to S2907.

At S2902, the application control unit 530G determines whether the module to be removed is registered in a front-side module column 2402 of the management table 2400. When any module is registered in the front-side module column 2402 of the management table 2400, the application control unit 530G moves to S2903, otherwise, the application control unit 530G moves to S2907.

At S2903, the application control unit 530G blinks the LED of that module. Then, at S2904, the application control unit 530G turns off the communication between the main body 112 and the module whose LED is brought into the blinking state at step S2903. At S2905, the application control unit 530G releases the module from the magnetic attraction to the main body 112 by the EPM. At S2906, the application control unit 530G executes the module removal routine. In addition, at S2906, the user can remove the module released from the magnetic attraction at step S2905, and the application control unit 530G terminates the removal routine described in FIG. 29 and returns to the calling source.

At S2907, the application control unit 530G determines, based on the output of the orientation detection unit 510, whether the electronic device 110 is in the back-side left module removable state for a predetermined period of time. When the back-side left module removable state lasts for the predetermined period of time, the application control unit 530G moves to step S2908, otherwise, the application control unit 530G moves to S2912.

At S2908, the application control unit 530G determines whether the module to be removed is registered in a back-side left module column 2404 of the management table 2400. If the application control unit 530G determines at step S2908 that any module is registered in the back-side left module column 2404, the application control unit 530G moves to S2909, otherwise, the application control unit 530G moves to S2912.

At S2909, the application control unit 530G blinks the LED of the registered module. At S2910, the application control unit 530G turns off the communication between the main body 112 and the module whose LED is brought into the blinking state at step S2909. At S2911, the application control unit 530G releases the module registered in the back-side left module column 2404 from the magnetic attraction to the main body 112 by the EPM. At S2906, the application control unit 530G executes the module removal routine. In addition, at S2906, the user can remove the module released from the magnetic attraction at step S2911, and the application control unit 530G terminates the removal routine described in FIG. 29 and returns to the calling source.

At S2912, the application control unit 530G determines, based on the output of the orientation detection unit 510, whether the electronic device 110 is in the back-side right module removable state for a predetermined period of time. When the back-side right module removable state lasts for the predetermined period of time at S2912, the application control unit 530G moves to step S2913, otherwise, the application control unit 530G moves to S2917.

At S2913, the application control unit 530G determines whether the module to be removed is registered in a back-side right module column 2406 of the management table 2400. If the application control unit 530G determines at step S2913 that any module is registered in the back-side right module column 2406, the application control unit 530G moves to S2914, otherwise, the application control unit 530G moves to S2917.

At S2914, the application control unit 530G blinks the LED of the module registered in the back-side right module column 2406. At S2915, the application control unit 530G turns off the communication between the main body 112 and the module whose LED is brought into the blinking state at step S2914. At S2916, the application control unit 530G releases the module registered in the back-side right module column 2406 from the magnetic attraction to the main body 112 by the EPM. At S2906, the application control unit 530G executes the module removal routine. In addition, at S2906, the user can remove the module released from the magnetic attraction at step S2916, and the application control unit 530G terminates the removal routine described in FIG. 29 and returns to the calling source.

At S2917, the application control unit 530G determines whether the electronic device 110 is in the front-side module, the back-side left module, or the back-side right module removable states based on the output of the orientation detection unit 510. If the application control unit 530G determines at step S2917 that the electronic device 110 is in any of the module removable states, the application control unit 530G returns to step S2901. If the application control unit 530G determines at step S2917 that the electronic device 110 is not in any of the module removable states, the application control unit 530G terminates the removal routine described in FIG. 29 and returns to the calling source.

Any of the modules can operate normally during the time between when the removal is confirmed at step S2206 and when the module is released from the magnetic force at step S2905, S2911, or S2916.

Figure 30:
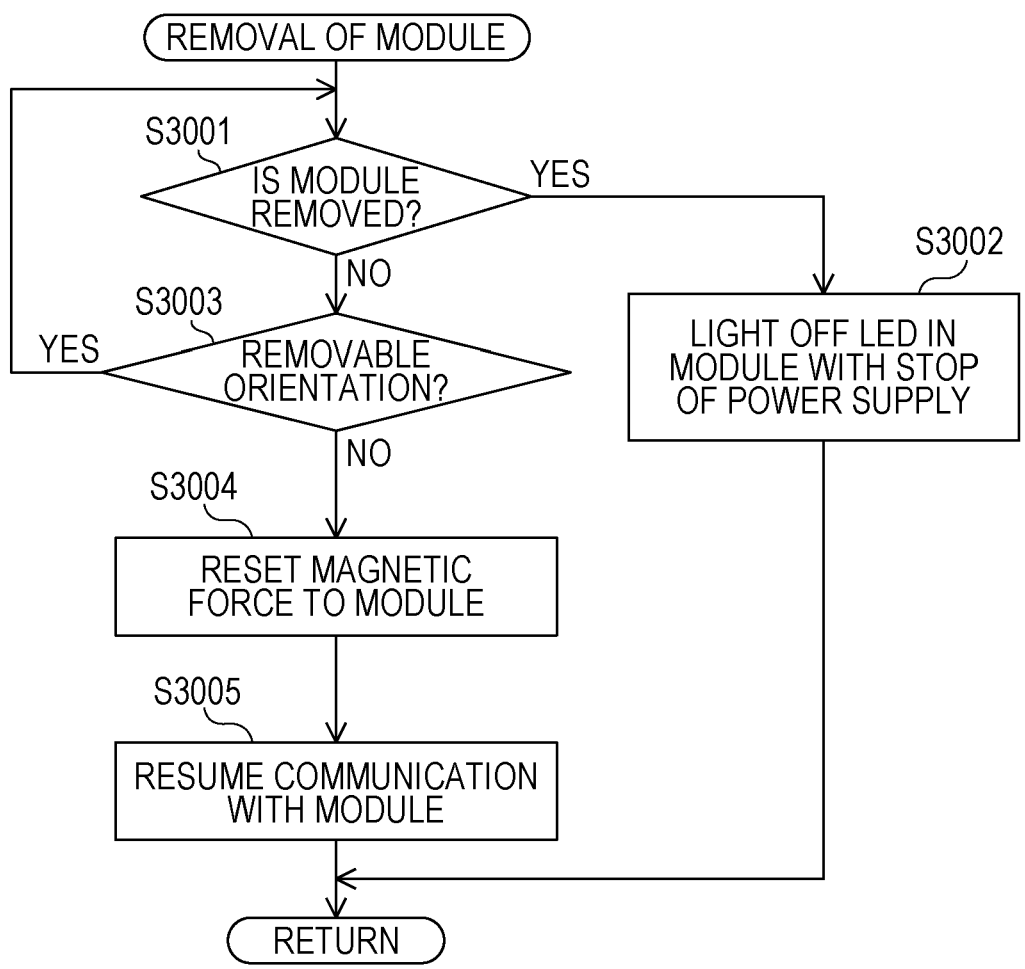
FIG. 30 is a flowchart of the module removal routine described in FIG. 29.

FIG. 30 is a detailed flowchart of the module removal routine (S2906). The application control unit 530G of the application control module 130G reads and executes the program corresponding to the process described in FIG. 30 to implement the operation described in FIG. 30.

At step S3001, the application control unit 530G determines whether the detection (DETECT) signal indicating the attachment of the module to be removed is on or off. This enables determination whether the module to be removed is attached or removed. If the application control unit 530G determines at step S3001 that the detection (DETECT) signal is off, i.e., the module is removed, the application control unit 530G moves to S3002. At S3002, the application control unit 530G stops power supply from the main body 112 to the module to turn off the LED of the module. In the case where the module includes its specific power source therein, the application control unit 530G transmits an LED turn-off command to the module when the detection (DETECT) signal becomes off, and the module turns off the LED in response to the command. After S3002, the application control unit 530G returns to the routine calling source described in FIG. 30.

If the application control unit 530G determines at S3001 that the detection (DETECT) signal is on, i.e., the module is attached, the application control unit 530G moves to S3003. At S3003, the application control unit 530G determines whether the orientation of the electronic device 110 is held in the module removable state based on the output of the detection by the orientation detection unit 510. If the application control unit 530G determines at S3003 that the orientation of the electronic device 110 is held in the module removable state, the application control unit 530G returns to step S3001. If the application control unit 530G determines at S3003 that the orientation of the electronic device 110 is not held in the module removable state, the application control unit 530G moves to S3004. At step S3004, the application control unit 530G resets the magnetic attraction of the module to the main body 112 by the EPM. At S3005, the application control unit 530G resumes the communication between the main body 112 and the module, terminates the module removal routine described in FIG. 30, and returns to S2210.

The procedure for the module removal operation will be explained with reference to FIGS. 31A to 33B.

Figure 31A:
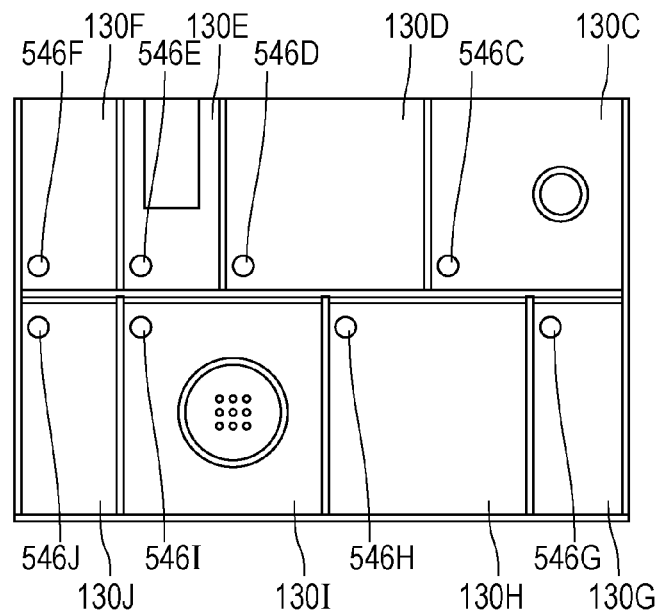
FIGS. 31A and 31B are diagrams describing operations of removing back-side left modules.
Figure 31B:
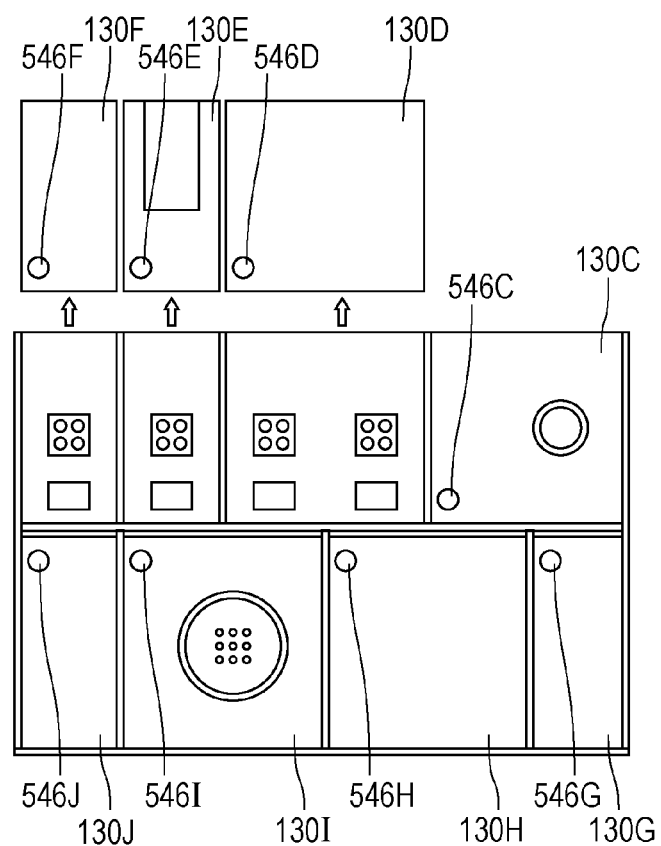

FIGS. 31A and 31B illustrate the process of the user removing the recording module 130D, the I/O module 130E, and the NFC module 130F confirmed to be removed at step S2206. FIG. 31A illustrates the attached state and FIG. 31B illustrates the removed state.

At S2907, the user flips and holds the electronic device 110 in the back-side left module removable state. At S3001, the user slides the three modules 130D, 130E, and 130F in the direction of the left side of the main body 112 (the upward direction in the drawing) to remove the same from the main body 112. In the state illustrated in FIG. 31A, the LEDs 546D, 546E, and 546F of the modules 130D, 130E, and 130F are blinking. When the user removes these modules 130D, 130E, and 130F from the main body 112 to turn the electronic device 110 into the state illustrated in FIG. 31B, the detection (DETECT) signal becomes off and the LEDs 546D, 546E, and 546F turn off. At this point, the LEDs 546H and 546J of the power supply module 130H and the communication module 130J not to be removed are in the on state.

Figure 32A:
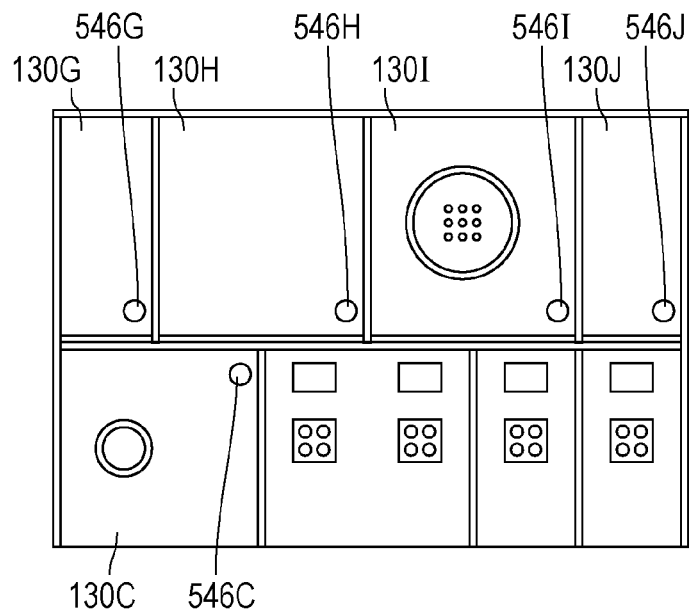
FIGS. 32A and 32B are diagrams describing operations of removing back-side right modules.
Figure 32B:
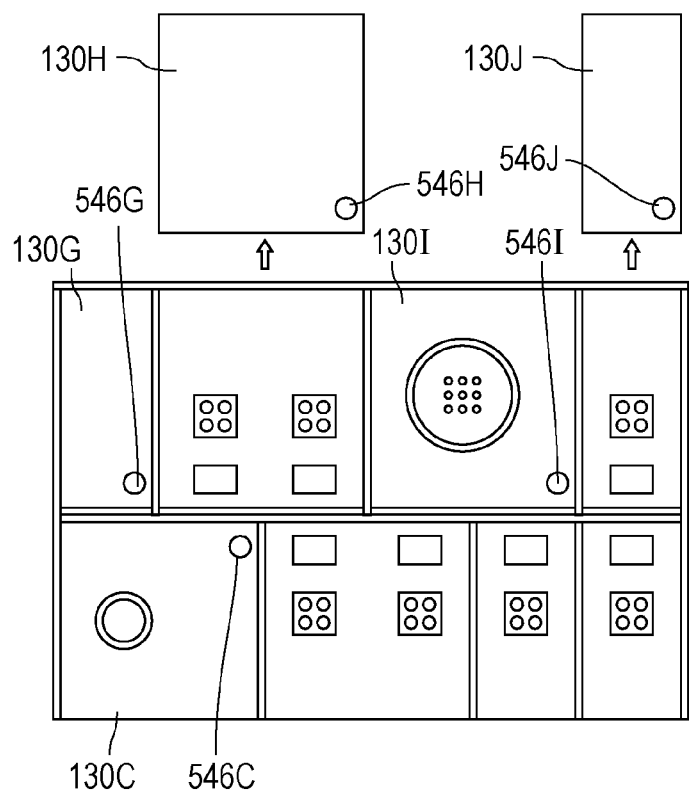

FIGS. 32A and 32B illustrate the process of removing the power supply module 130H and the communication module 130J determined to be removed at S2206 after the removal of the modules 130D, 130E, and 130F from the main body 112. FIG. 32A illustrates the attached state and FIG. 32B illustrates the removed state.

At S2912, the user flips and holds the electronic device 110 in the back-side right module removable state. At S3001, the user slides the two modules 130H and 130J in the direction of the right side of the main body 112 (the upward direction in the drawing) to remove the same from the main body 112. In the state illustrated in FIG. 32A, the LEDs 546H and 546J of the modules 130H and 130J are blinking. When the user removes these modules 130H and 130J to turn the electronic device 110 into the state illustrated in FIG. 32B, the detection (DETECT) signal becomes off and the LEDs 546H and 546J turn off.

Figure 33A:
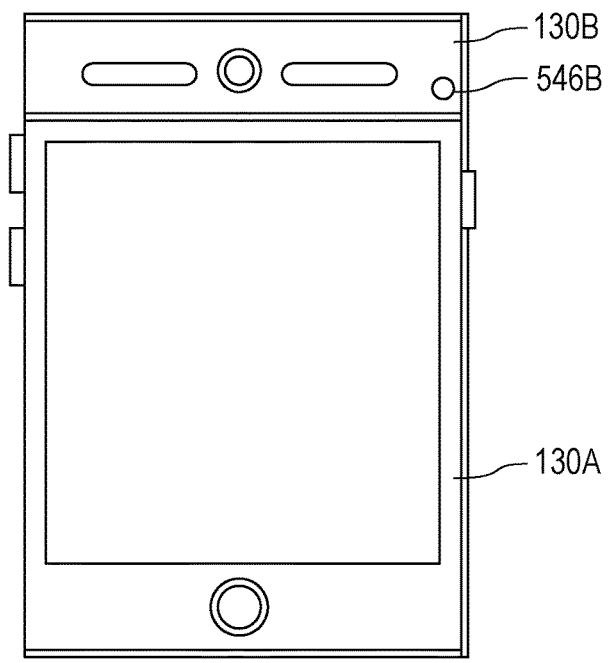
FIGS. 33A and 33B are diagrams describing operations for removing the front-side module.
Figure 33B:
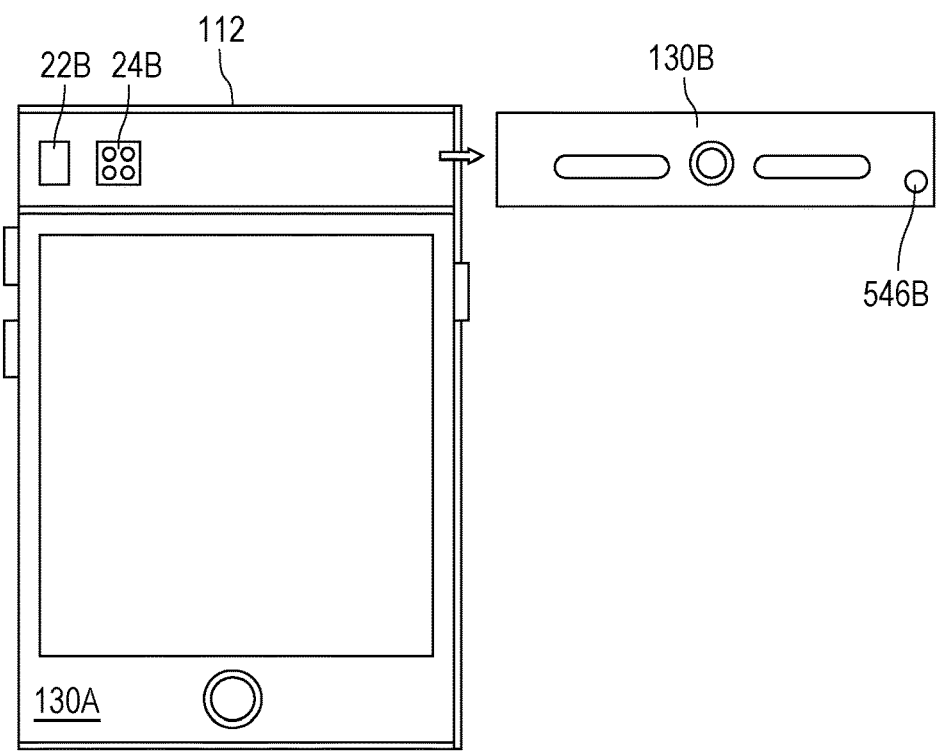

FIGS. 33A and 33B illustrate the process of the user removing the microphone/camera module 130B determined to be removed at S2202 after the removal of the power supply module 130H and the communication module 130J. FIG. 33A illustrates the attached state and FIG. 33B illustrates the removed state.

The user flips and holds the electronic device 110 in the front-side module removable state. The user slides the target module in the direction of the lateral side of the main body 112 to remove the same from the main body 112. Referring to FIGS. 33A and 33B, the microphone/camera module 130B is slid and removed in the direction of the right side of the main body 112. Alternatively, the microphone/camera module 130B can be slid and removed in the direction of the left side of the main body 112. In the state illustrated in FIG. 33A, the LED 546B of the microphone/camera module 130B is blinking. When the user removes the module 130B to turn the electronic device 110 in the state illustrated in FIG. 33B, the detection (DETECT) signal becomes off and the LED 546B of the microphone/camera module 130B turns off.

Based on the above-described control with reference to FIGS. 29 and 30, in this example, the user can check the module to be removed by the LED and recognize the completion of the removal. The user is able to remove the module to be removed in the orientation in which the module will not drop under its own weight, thereby significantly reducing the risk of the module dropping.

FIGS. 34A to 34D illustrate changes in the registered contents of the management table 2400 updated at S2210 at removal of the modules 130D, 130E, 130F, 130H, 130J, and 130B.

FIG. 34A illustrates the registered contents of the management table 2400 when the user selects and confirms the modules to be removed at S2210. In this example, the microphone/camera module 130B, the recording module 130D, the I/O module 130E, the NFC module 130F, the power supply module 130H, and the communication module 130J are set to be removed. The microphone/camera module 130B is registered in the front-side module column 2402. The recording module 130D, the I/O module 130E, and the NFC module 130F are registered in the back-side left module column 2404. The power supply module 130H and the communication module 130J are registered in the back-side right module column 2406.

FIG. 34B illustrates the contents of the management table 2400 after the user removes the recording module 130D, the I/O module 130E, and the NFC module 130F in the removal routine (S2209). As illustrated by the contents in FIG. 34A, the recording module 130D, the I/O module 130E, and the NFC module 130F are deleted from the back-side left module column 2402.

FIG. 34C illustrates the contents of the management table 2400 after the user removes the power supply module 130H and the communication module 130J at S2209 after having undergone S2207 in the state illustrated in FIG. 34B. As illustrated by the contents illustrated in FIG. 34B, the power supply module 130H and the communication module 130J are deleted from the back-side right module column 2406.

FIG. 34D illustrates the contents of the management table 2400 after the user removes the microphone/camera module 130B at S2209 after having undergone S2207 in the state illustrated in FIG. 34C. As illustrated by the contents illustrated in FIG. 34C, the microphone/camera module 130B is deleted from the front-side module column 2402. In this state, no module is registered in the management table 2400.

The application control unit 530G returns from the state illustrated in FIG. 34D to S2207, and determines at step S2211 whether any module is registered in the management table 2400. Since no module is registered in the management table 2400, the application control unit 530G moves to step S2212.

EXAMPLE 6

At S2905, S2911, and S2915 described in FIG. 29, a guidance to prompt for removal of the modules can be output after the release of the modules to be removed from the magnetic force.

Figure 35:
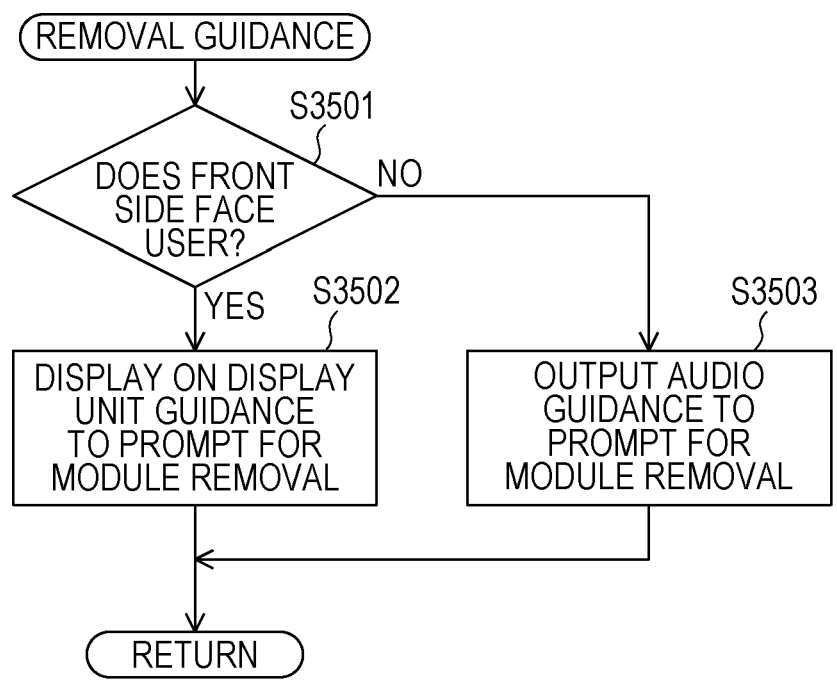
FIG. 35 is a flowchart of output of the module removal guidance.

FIG. 35 is a flowchart of the process of displaying the module removal guidance described above. The application control unit 530G of the application control module 130G reads and executes the program corresponding to the process described in FIG. 35 to implement the operation described in FIG. 35. When the module to be removed is released from the magnetic force at S2905, S2911, or S2915, the application control unit 530G starts the process described in FIG. 35.

At step S3501, the application control unit 530G determines whether the front side of the electronic device 110 faces the user based on an orientation value or an orientation direction detected by the orientation detection unit 510. The application control unit 530G can make the orientation determination by using the output of the acceleration sensor 511 and the image captured by either the microphone/camera module 130B or the camera module 130C.

If the application control unit 530G determines at S3501 that the front side of the electronic device 110 faces the user, the application control unit 530G moves to S3502. At S3502, the application control unit 530G displays a module removal guidance 3600, 3700, or 3800 on the display unit 532A based on the determination at S2901, S2907, or S2912. After that, the application control unit 530G terminates the removal guidance routine described in FIG. 35, and returns to the calling source.

If the application control unit 530G does not determine at step S3501 that the front side of the electronic device 110 faces the user, the application control unit 530G moves to S3503. At S3503, the application control unit 530G outputs an audio guidance to prompt for removal of the module from the speaker module 130I according to the determination result at S2901, S2907, or S2912. This is because, when the front side of the electronic device 110 does not face the user, it is difficult for the user to view the screen on the display unit 532A. After S3503, the application control unit 530G terminates the orientation change guidance routine described in FIG. 35 and returns to the calling source.

The audio guidance output at S3503 can be, for example, "Remove the selected front-side module," "Remove the selected back-side left module," "Remove the selected back-side right module," or the like. The content of the audio guidance can be any content other than the foregoing examples or can just be an audible sound such as a beep. The guidance can also be non-audible in nature, such as a vibration.

Figure 36:
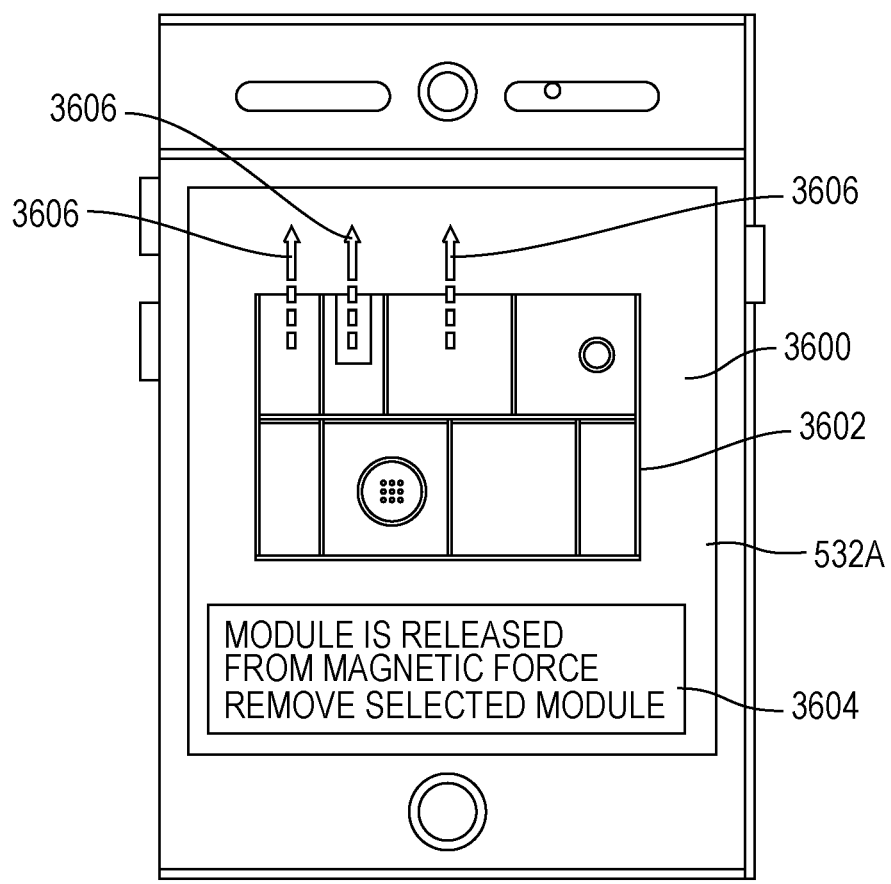
FIG. 36 is a diagram describing a guidance prompt for removal of back-side left modules.
Figure 37:
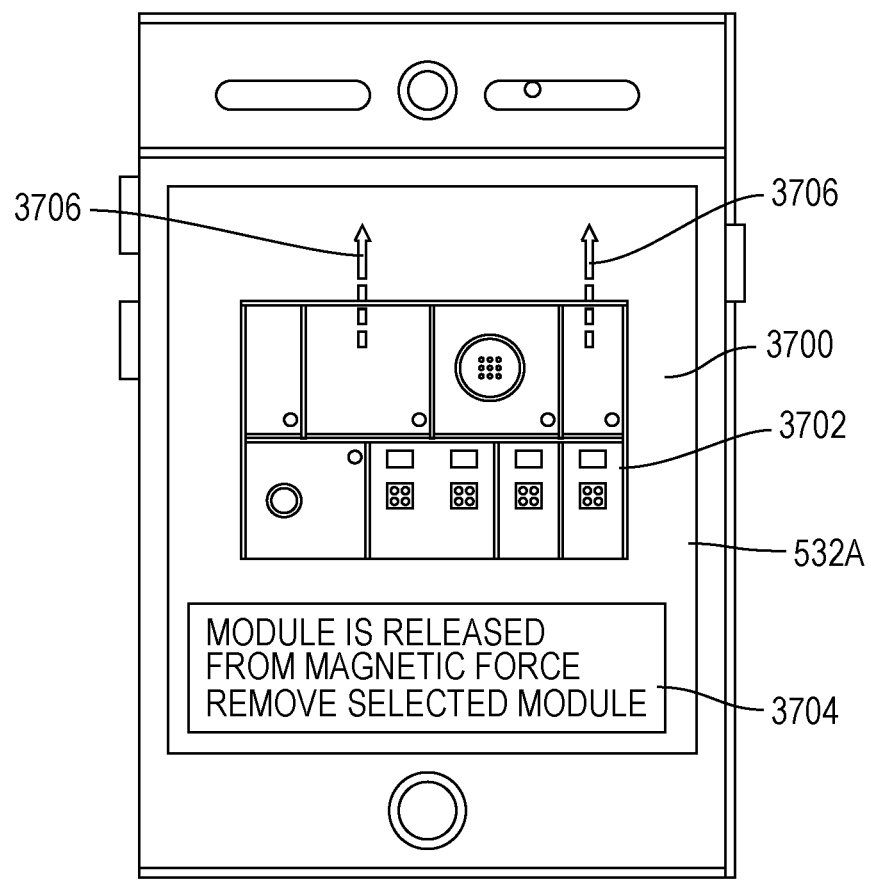
FIG. 37 is a diagram describing a guidance to prompt for removal of back-side right modules.
Figure 38:
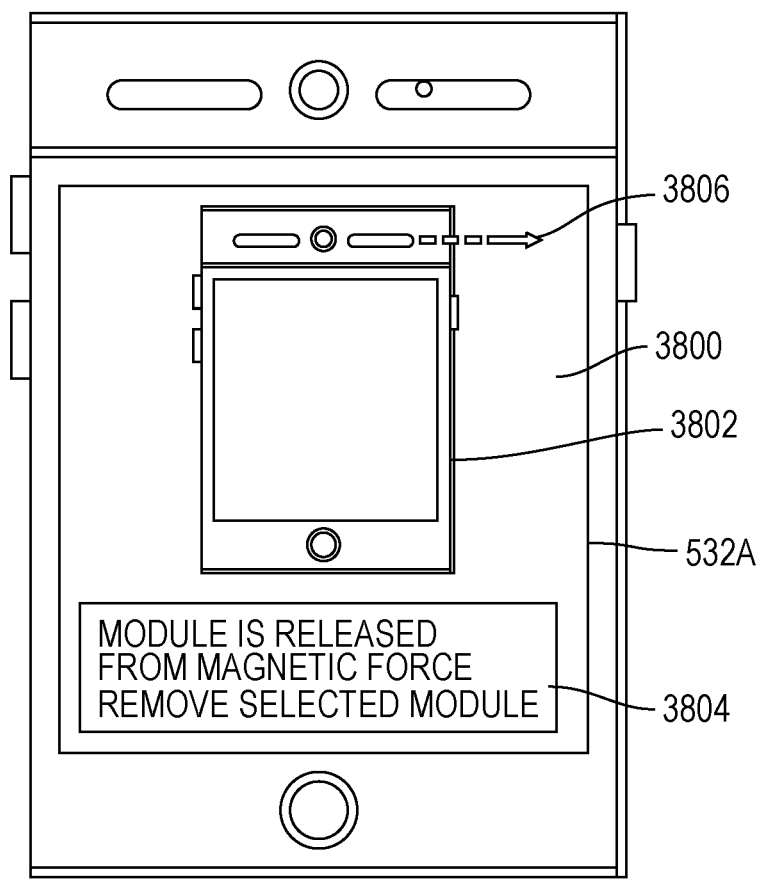
FIG. 38 is a diagram describing a guidance to prompt for removal of a front-side module.

FIGS. 36, 37, and 38 illustrates examples of the guidance displayed on the display unit 532A at S3502. FIG. 36 illustrates an orientation change guidance 3600 to prompt for removal of the module attached on the left back side of the electronic device 110. FIG. 37 illustrates an orientation change guidance 3700 to prompt for removal of the module attached on the right back side of the electronic device 110. FIG. 38 illustrates an orientation change guidance 3800 to prompt for removal of the module attached on the front side of the electronic device 110.

The removal guidance 3600 illustrated in FIG. 36 is displayed immediately after S2911. The removal guidance 3600 includes a back image 3602 of the electronic device 110 with the left back side upward, a message 3604 to prompt for removal of the modules, and arrows 3606 indicating the sliding direction of the modules after the release from the magnetic force.

The removal guidance 3700 illustrated in FIG. 37 is displayed immediately after S2916. The removal guidance 3700 includes a back image 3702 of the electronic device 110 with the right back side upward, a message 3704 to prompt for removal of the modules, and arrows 3706 indicating the sliding direction of the modules after the release from the magnetic force.

The removal guidances 3600 and 3700 can be displayed on the display unit 532A when the user forgets the modules selected to be removed in the process of the module removal and faces the screen on the display unit 532A toward the user.

The removal guidance 3800 illustrated in FIG. 38 is displayed immediately after S2905. The removal guidance 3800 includes a front image 3802 of the electronic device 110, a message 3804 to prompt for removal of the module, and an arrow 3806 indicating the sliding direction of the module after the release from the magnetic force.

The foregoing guidances 3600, 3700, and 3800 are examples for explaining display, outputting, and erasing timings, and the contents and timings of displaying the guidance are not limited to the foregoing examples. The display contents and display timings different from the foregoing examples can be selected as appropriate.

According to the foregoing examples, after an instruction for removal is provided by a touch operation, the module is released from the fixing force based on an operation on another operation member, thereby making it possible to prevent the module from unexpectedly dropping when being removed. In addition, when the module to be removed can drop due to the orientation of the main body, the module is not released from the fixing force, thereby preventing unexpected dropping.

OTHER EMBODIMENTS

Embodiment(s) can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While exemplary embodiments have been described, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-110463, filed Jun. 1, 2016, which is hereby incorporated by reference herein in its entirety.

What is claimed is:

1. An electronic device comprising:
an attachment/detachment unit configured to connect a module to the electronic device in a removable manner;
an orientation detection unit configured to detect an orientation of the electronic device; and
a control unit configured to perform control such that a module to be removed from the electronic device is disconnected by the attachment/detachment unit when the module to be removed is in an orientation suited for removal from the electronic device based on a result of detection by the orientation detection unit.

2. The electronic device according to claim 1, wherein
the electronic device includes a plurality of attachment/detachment units, and
wherein the control unit disconnects the module to be removed from the electronic device by a corresponding attachment/detachment unit from among the plurality of the attachment/detachment units based on a result of detection by the orientation detection unit.

3. The electronic device according to claim 1, wherein
a removal guidance is displayed on a display when it is detected that the module to be removed is in the orientation suited for removal from the electronic device.

4. The electronic device according to claim 3, wherein
the display includes an operation unit arranged on a side surface of the display, and when the electronic device is in an orientation suitable for removal of the display, the display is disconnected by an attachment/detachment unit corresponding to the display based on an operation on the operation unit.

5. The electronic device according to claim 4, wherein
the display includes a member operable in a direction vertical to a direction in which the display is removed, and the operation on the operation unit is an operation in the direction vertical to the direction in which the display is removed.

6. The electronic device according to claim 3, wherein
the display includes a touch panel connected to the electronic device and removable by the attachment/detachment unit.

7. The electronic device according to claim 1, wherein
the electronic device includes a front side and a back side, and the module connects to either the front side or the back side.

8. The electronic device according to claim 1, wherein
the module is connected to the electronic device by sliding the module onto the electronic device either from a right side or a left side of the electronic device.

9. The electronic device according to claim 1, wherein
the attachment/detachment unit includes a permanent magnet and a permanent electromagnet, which reverses a polarity based on a direction of excitation current, which are arranged in parallel, and connects and disconnects a corresponding module by controlling the excitation current of the permanent electromagnet.

10. The electronic device according to claim 1, wherein
the orientation detection unit includes an acceleration sensor, and the orientation of the electronic device is detected based on an output of the acceleration sensor.

11. The electronic device according to claim 1, further comprising a camera, wherein
the orientation detection unit detects the orientation of the electronic device based on an image captured by the camera.

12. The electronic device according to claim 1, wherein
the module is a camera.

13. The electronic device according to claim 1, wherein
the control unit provides guidance indicating a procedure for removal operation until the module to be removed is removed.

14. The electronic device according to claim 1, further comprising an audio output unit, wherein
when the module to be removed is a module attached on a back side of the electronic device, the control unit outputs an audio guidance, from the audio output unit, indicating a procedure for a removal operation.

15. A control method of an electronic device including an attachment/detachment unit configured to connect a module to the electronic device in a removable manner, the method comprising:
an orientation detection step of detecting an orientation of the electronic device; and
a control step of performing control such that a module to be removed from the electronic device is disconnected by the attachment/detachment unit when the module to be removed is in an orientation suited for removal from the electronic device based on a result of detection by the orientation detection unit.

16. A non-transitory computer-readable storage medium storing computer executable instructions that cause a computer to execute a control method of an electronic device including an attachment/detachment unit configured to connect a module to the electronic device in a removable manner, the method comprising:
an orientation detection step of detecting an orientation of the electronic device; and
a control step of performing control such that a module to be removed from the electronic device is disconnected by the attachment/detachment unit when the module to be removed is in an orientation suited for removal from the electronic device based on a result of detection by the orientation detection unit.

* * * * *